United States Patent
Bagwell et al.

(10) Patent No.: US 11,789,155 B2
(45) Date of Patent: Oct. 17, 2023

(54) PEDESTRIAN OBJECT DETECTION TRAINING

(71) Applicant: Zoox, Inc., Foster City, CA (US)

(72) Inventors: Carden Taylor Bagwell, San Francisco, CA (US); Subhasis Das, Menlo Park, CA (US); Troy Donovan O'Neal, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 580 days.

(21) Appl. No.: 16/726,097

(22) Filed: Dec. 23, 2019

(65) Prior Publication Data

US 2021/0192196 A1 Jun. 24, 2021

(51) Int. Cl.

| | |
|---|---|
| *G01S 17/931* | (2020.01) |
| *G06N 20/00* | (2019.01) |
| *G01S 7/48* | (2006.01) |
| *G06V 40/20* | (2022.01) |
| *G06V 20/58* | (2022.01) |
| *G06F 18/214* | (2023.01) |

(52) U.S. Cl.
CPC .......... *G01S 17/931* (2020.01); *G01S 7/4802* (2013.01); *G06F 18/214* (2023.01); *G06N 20/00* (2019.01); *G06V 20/58* (2022.01); *G06V 40/25* (2022.01)

(58) Field of Classification Search
CPC ...................................................... G06V 40/25
USPC ........................................ 706/12; 375/240.03
See application file for complete search history.

(56) References Cited

U.S. PATENT DOCUMENTS

| | | |
|---|---|---|
| 9,612,123 B1 | 4/2017 | Levinson et al. |
| 10,002,129 B1* | 6/2018 | D'Souza ............... G06F 40/289 |
| 10,353,390 B2 | 7/2019 | Linscott et al. |
| 2013/0142393 A1 | 6/2013 | Lord et al. |
| 2015/0268665 A1 | 9/2015 | Ludwick et al. |
| 2016/0371549 A1 | 12/2016 | Thiel et al. |
| 2017/0120803 A1 | 5/2017 | Kentley et al. |
| 2018/0275658 A1* | 9/2018 | Iandola .................. G06F 30/20 |
| 2019/0080184 A1 | 3/2019 | Gerardo Castro et al. |
| 2019/0156485 A1 | 5/2019 | Pfeiffer |
| 2019/0285752 A1* | 9/2019 | Chattopadhyay ..... G01S 17/931 |
| 2019/0325580 A1 | 10/2019 | Lukac et al. |

(Continued)

FOREIGN PATENT DOCUMENTS

| | | |
|---|---|---|
| WO | WO2012115920 A2 | 8/2012 |
| WO | WO2017079349 A1 | 5/2017 |

OTHER PUBLICATIONS

Office Action for U.S. Appl. No. 16/726,042, dated Oct. 27, 2021, Bagwell, "Pedestrians With Objects", 25 pages.

(Continued)

*Primary Examiner* — Ruay Ho
(74) *Attorney, Agent, or Firm* — Lee & Hayes, P.C.

(57) ABSTRACT

Training a model for detecting pedestrian objects is described. Annotated data can be received by a training component. In an example, the annotated data can include a first indication of a first object (e.g., a pedestrian) and a second indication of a second object (e.g., a pedestrian object), wherein the first object and the second object comprise a portion of a compound object (e.g., a pedestrian/pedestrian object system). In an example, a training component can train a model to determine an output associated with a second object based at least in part on the annotated data and the model can be transmitted to a vehicle configured to be controlled by output(s) of the model.

20 Claims, 8 Drawing Sheets

(56) References Cited

U.S. PATENT DOCUMENTS

| | | |
|---|---|---|
| 2019/0332118 A1 | 10/2019 | Wang et al. |
| 2020/0073969 A1* | 3/2020 | Kursar ................... G06N 20/00 |
| 2020/0160070 A1* | 5/2020 | Sholingar .............. G06V 10/82 |
| 2020/0284607 A1 | 9/2020 | Mangal et al. |
| 2020/0320659 A1* | 10/2020 | Whiting ................. B25J 19/023 |
| 2020/0409387 A1 | 12/2020 | Tsurumi |
| 2020/0410259 A1 | 12/2020 | Srinivasan |
| 2021/0004976 A1* | 1/2021 | Guizilini .............. G06K 9/6257 |
| 2021/0097354 A1 | 4/2021 | Amato et al. |
| 2021/0192199 A1 | 6/2021 | Bagwell et al. |
| 2023/0154055 A1* | 5/2023 | Besenbruch ......... G06V 10/774 |
| | | 375/240.03 |

OTHER PUBLICATIONS

PCT Search Report and Written Opinion dated Mar. 12, 2021 for PCT Application No. PCT/US20/64851, 9 pages.

* cited by examiner

PEDESTRIAN OBJECT DETECTION TRAINING

BACKGROUND

Autonomous vehicles can use sensors to capture data of an environment. To navigate an environment effectively, autonomous vehicles use sensor data to detect objects in the environment to avoid collisions. A perception system, for example, allows an autonomous vehicle to recognize objects in the environment so that the autonomous vehicle can plan a safe route through the environment. In an example, segmentation techniques can be used for associating sensor data with objects. The safe operation of an autonomous vehicle depends, at least in part, on information made available by the perception system in detecting, classifying, and predicting motion of objects detected in the sensor data. Thus, inaccurate and/or incomplete information provided by such detection, classification, and/or prediction of objects can reduce the safety with which autonomous vehicles can operate.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
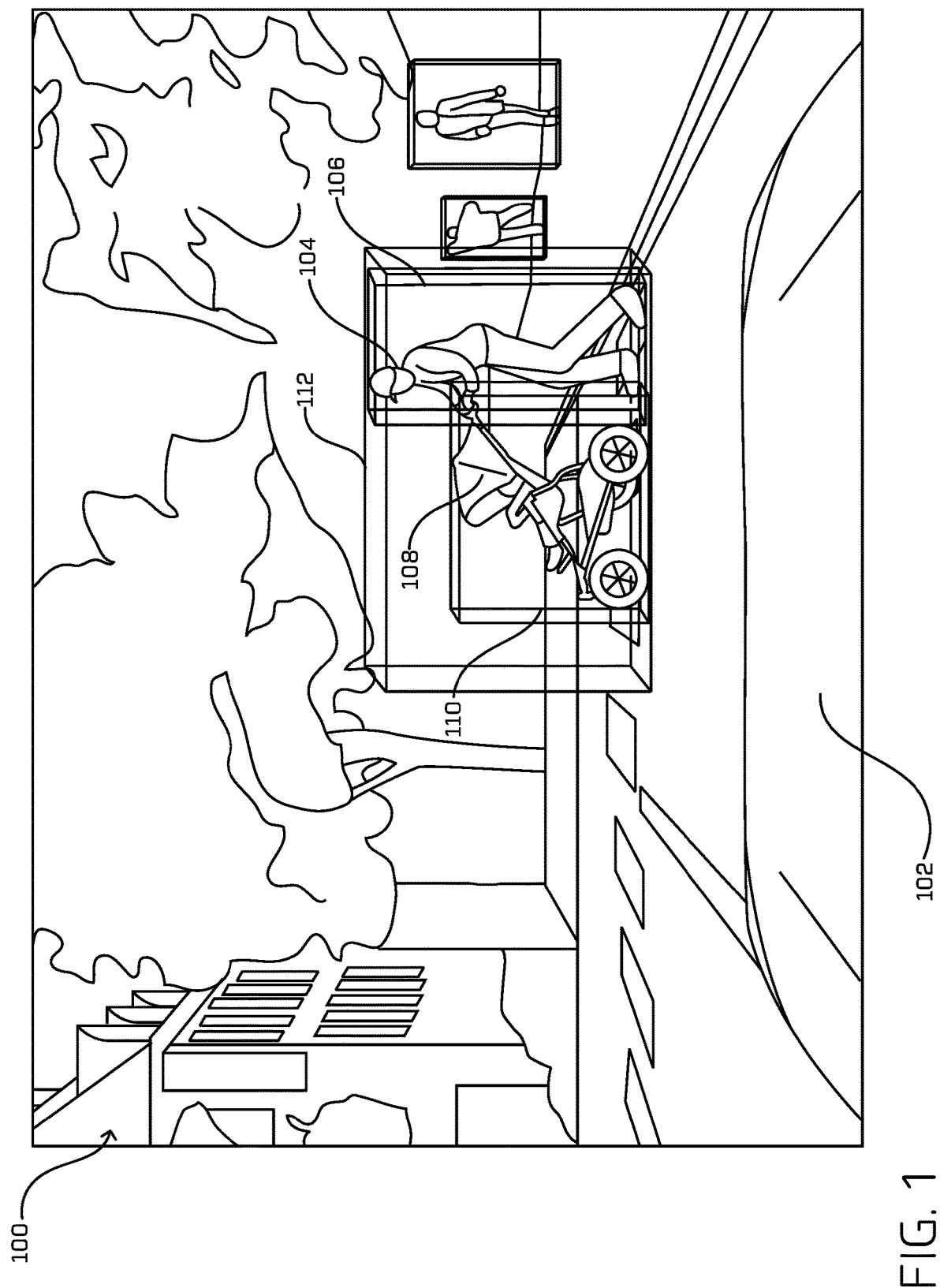
FIG. 1 illustrates an example environment in which pedestrian objects can be detected as described herein.

Techniques described herein relate to training model(s) for detecting objects associated with pedestrians and using the model(s) by vehicles, such as autonomous vehicles. In an example, such model(s) can be used to detect objects associated with pedestrians within environments of vehicles and, based on detecting such objects, and the vehicles can determine how to handle such pedestrians and associated objects. In an example, a pedestrian can be associated with an object such as a suitcase, a stroller, cart, an umbrella, or other object. Such objects can cause an extension in the pose and/or position of the pedestrian, but the motion of the object can be controlled by the pedestrian and, in some examples, can constrain motion of the pedestrian (e.g., a pedestrian may not be able to move as fast when carrying a suitcase, may not be able to move up and down curbs with a stroller, or may be constrained in lateral accelerations). As such, the pedestrian can be larger (e.g., occupy more space) than a pedestrian without an object and/or can move differently than a pedestrian without an object. Techniques described herein enable detection of objects associated with pedestrians, for example via a model trained to detect objects and/or model(s) trained to determine how pedestrians and associated objects move so that computing devices onboard autonomous vehicles, for example, can determine how to control such autonomous vehicles.

In an example, a model can be trained to detect the presence of an object that is associated with a pedestrian. For the purpose of this discussion, such objects can be called "pedestrian objects." A pedestrian object is an object that is attached to a pedestrian that (i) modifies the geometry of the pedestrian (e.g., from that of a pedestrian without an object) and (ii) has a motion trajectory that is controlled by the pedestrian. Non-limiting examples of pedestrian objects include strollers, suitcases, umbrellas, large boxes, children (e.g., being carried), motorcycles, carts, wheelchairs, etc. An object such as an animal on a leash may not be considered a pedestrian object because a motion trajectory of the animal is not controlled by the pedestrian (e.g., the animal can walk in any trajectory it would like within the limitations of the leash). Similarly, a child holding hands with an adult pedestrian may not be considered a pedestrian object.

In an example, the model can be a neural network which uses a "top-down segmentation" algorithm as described in U.S. patent application Ser. No. 15/963,833, filed on Apr. 26, 2018, the contents of which are incorporated by reference herein in its entirety. Such a model can be trained, using machine learning techniques, to detect a pedestrian object associated with a pedestrian. In at least one example, an indication, such as a bounding region, can be associated with the pedestrian, the pedestrian object, and the combination of the pedestrian and the pedestrian object (referred to herein as a pedestrian/pedestrian object system). That is, the pedestrian and the pedestrian object can each be components of a compound object that comprises the pedestrian and the pedestrian object. In at least one example, the bounding regions can be provided to a prediction component and/or a planning component, as described below, to generate a trajectory for an autonomous vehicle that traverses an environment using the trajectory. That is, the bounding regions can be provided to downstream components of an autonomous vehicle to control the autonomous vehicle. In some instances, data associated with the detected objects can be provided to other segmentation algorithms and/or classification algorithms for further processing. These and other operations are possible as part of the techniques described herein.

Existing classification techniques may adequately classify objects such as cars, pedestrians, bicycles, and the like. However, existing classification techniques may misclassify, or may not be trained to classify, rare objects that are not commonly seen while driving. Such rare objects, however, are important to how autonomous vehicles perceive the state of the environments within which they travel and determine how to navigate within such environments. An example of such a rare object is a pedestrian with an object. Techniques described herein enable the detection of such pedestrian objects such that techniques described herein maintain and/or increase the accuracy of determining and detecting objects in an environment, thereby increasing the functioning of a computing device. As can be understood, maintaining and/or increasing the accuracy of determining and detecting objects can improve safety outcomes, particularly in the context of vehicles and autonomous vehicles. Thus, the techniques described herein can improve a functioning of a computing device as well as improve safety outcomes.

While techniques described above are directed to the detection of pedestrians and objects associated therewith (e.g., pedestrian objects), techniques described herein may be applied to any number of types of objects and associated objects that are attached to respective objects (e.g., the other respective objects control the motion of the associated objects) and/or modify geometries of the other respective objects. For example, techniques described herein can be applicable to detecting an open door of a vehicle, a child carrier attached to a bicycle, or the like. That is, techniques described herein should not be construed as being limited to the detection of pedestrians and pedestrian objects.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle of whether it is safe to perform various maneuvers. In another example, the techniques can be utilized in an aviation or nautical context, or in any component involving objects or entities that may be associated with behavior that is unknown to the component. In some examples, the techniques can be utilized in contexts outside of autonomous vehicles and/or perception components. That is, in some examples, techniques described herein can be applicable to weather data, financial data, etc. Furthermore, the techniques described herein can be used with real data (e.g., captured using sensor(s)), simulated data (e.g., generated by a simulator), or any combination of the two.

Figure 2:
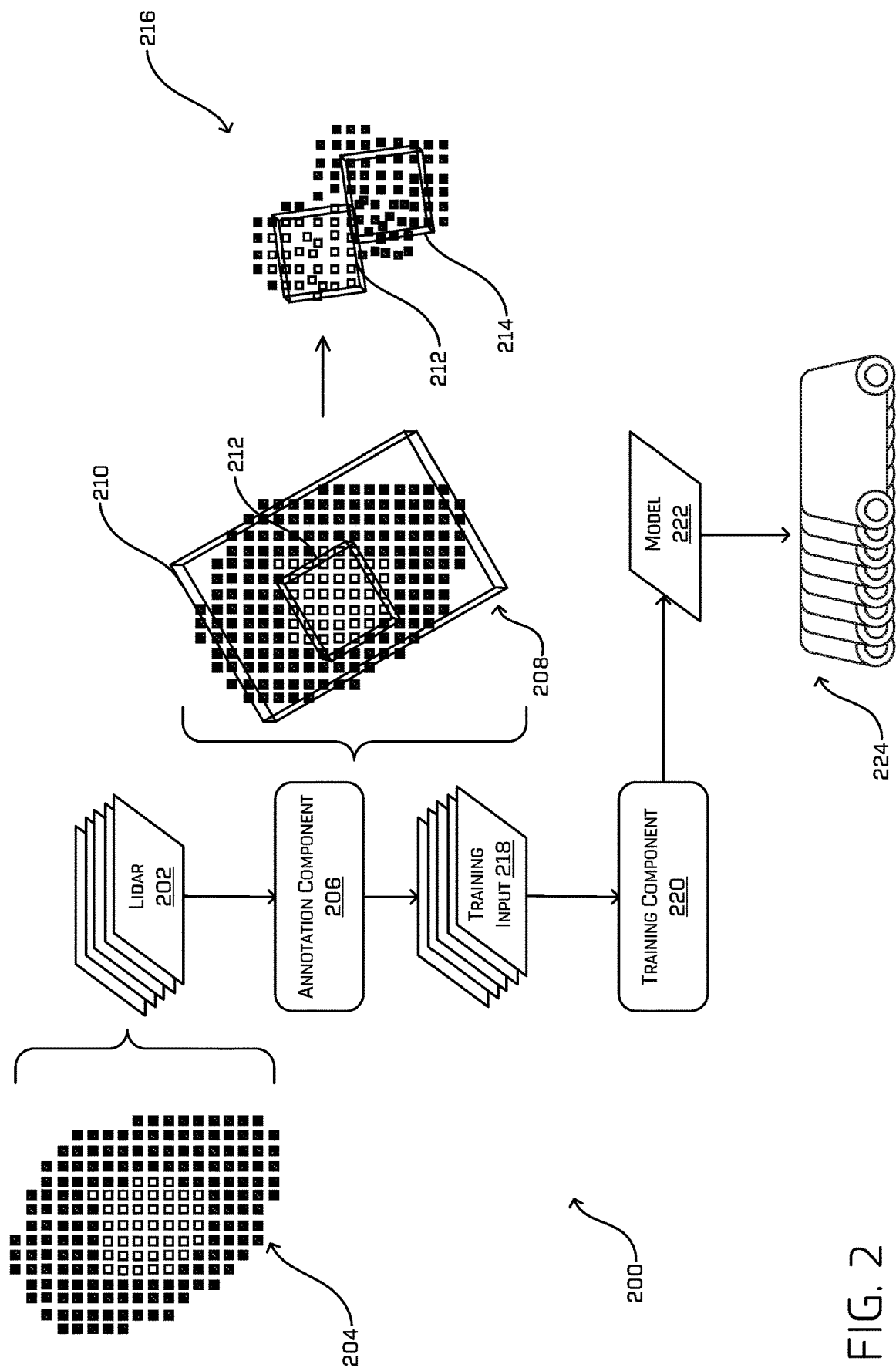
FIG. 2 illustrates an example process for training a model for detecting pedestrian objects as described herein.
Figure 3:
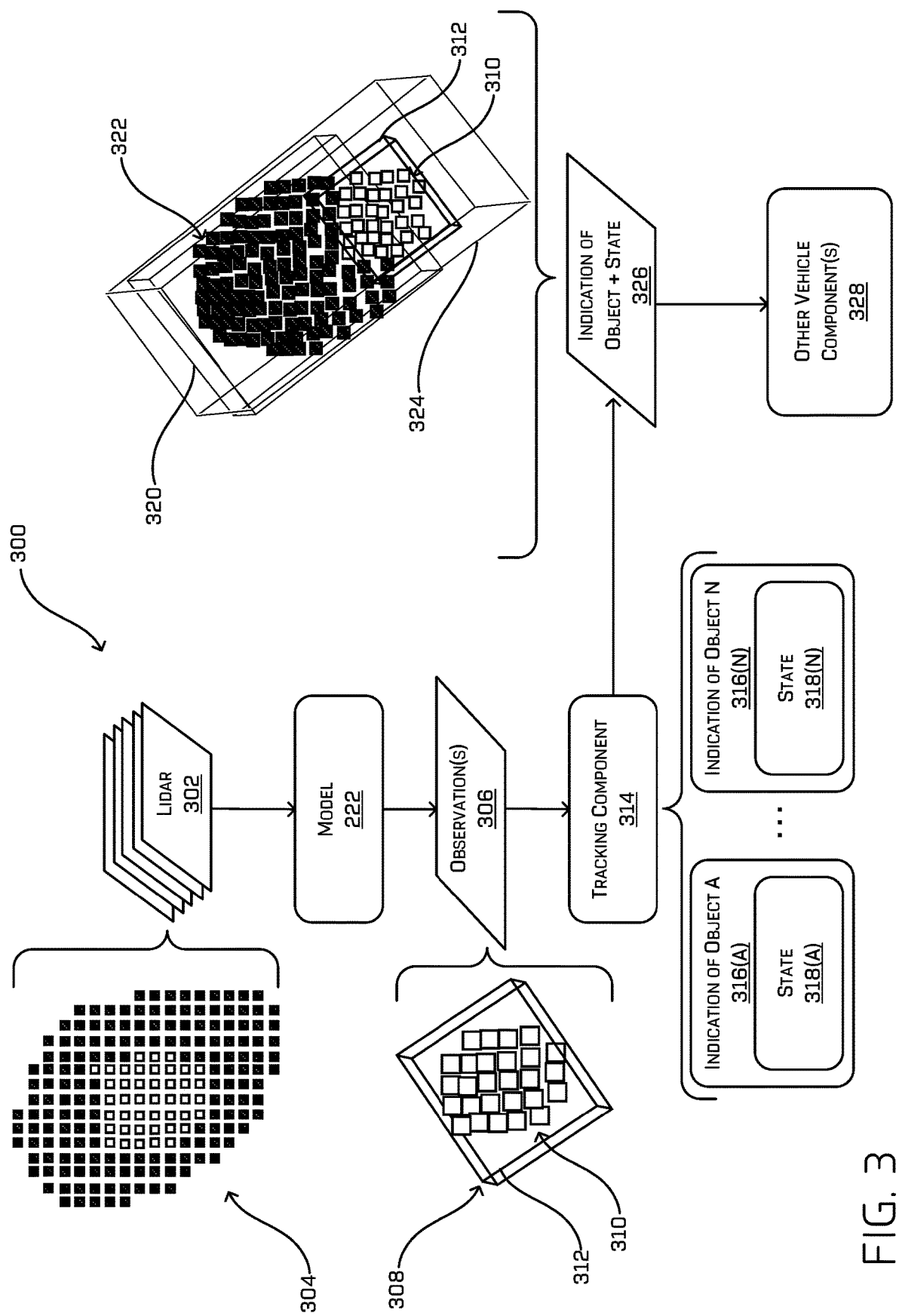
FIG. 3 illustrates an example process for detecting pedestrian objects, and determining movement associated therewith, as described herein.

FIG. 1 illustrates an example environment 100 in which pedestrian objects can be detected. FIG. 1 is provided as an overview of techniques described herein. FIGS. 2 and 3 provide additional details associated with training a model for detecting pedestrian objects (e.g., FIG. 2) and for using such a model (e.g., FIG. 3). Additional details associated with the system(s) described herein are described below with reference to FIG. 4.

In at least one example, a vehicle 102 can be driving within the environment 100. In at least one example, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 102 is an autonomous vehicle; however, the vehicle 102 could be any other type of vehicle.

In at least one example, the vehicle 102 can be associated with vehicle computing device(s), described below with reference to FIG. 4, which can include one or more components for controlling the vehicle 102. In at least one example, a perception component can perform object detection, segmentation, and/or classification based at least in part on sensor data received from sensor component(s) of the vehicle 102. In at least one example, the sensor component(s) can include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. Such sensor data can include, but is not limited to, lidar data, radar data, ultrasonic transducer data, sonar data, location data (e.g., global positioning component (GPS), compass, etc.), inertial data (e.g., inertial measurement units data, accelerometer data, magnetometer data, gyroscope data, etc.), camera data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, the perception component can receive sensor data and can utilize one or more machine-trained models to perform object detection, segmentation, and/or classification with respect to object(s) identified in the sensor data. In some examples, the perception component can associate a bounding region (or other indication) with an identified object and can associate a confidence score associated with a classification of the identified object with the identified object. In some examples, objects, when rendered via a display, can be colored based on their perceived class.

As an example, lidar data can be captured by one or more lidar sensor component(s) of the vehicle 102 and the perception component can associate the captured lidar data with a voxel space. The voxel space can represent the lidar data in a grid of voxels in a three-dimensional space. With the lidar data represented in the voxel space, the perception component can use a machine-trained model to output a mask associated with individual objects detected in the environment. In some examples, a mask can be represented in a plan view or top-down perspective (e.g., "top-down segmentation"). That is, as described above, in at least one example, the machine-trained model can be a neural network such as a "top-down segmentation" algorithm as described in U.S. patent application Ser. No. 15/963,833, filed on Apr. 26, 2018, the contents of which are incorporated by reference herein in its entirety. Additional details associated with segmentation are described in U.S. patent application Ser. No. 15/820,245, filed on Nov. 21, 2017 the contents of which are incorporated by reference herein in its entirety. In some examples, the mask can be represented in an elevation view or a side perspective. In at least one example, a machine-trained model, as described above, may be trained to output a mask having dimensions slightly smaller than associated ground truth objects.

While techniques described above are directed to detection, segmentation, and/or classification with respect to object(s) in lidar data, techniques described herein can be applicable to additional or alternative types of sensor data, including but not limited to image data, radar data, audio sensor data, thermal sensor data, pressure sensor data, etc., which may or may not be within the domain of autonomous vehicles.

In at least one example, the perception component associated with the vehicle 102 can detect a pedestrian 104 in the environment 100. In such an example, the perception component can associate a bounding region 106 (or other indication) with the pedestrian 104. In at least one example, the pedestrian 104 can be associated with a pedestrian object 108 (e.g., a stroller), which can be detected using techniques described herein. That is, techniques described herein relate, in part, to training a machine-trained model to detect the pedestrian object 108. In such an example, based at least in part on determining that a pedestrian object 108 is present in the environment 100, the perception component can associate a bounding region 110 (or other indication) with the pedestrian object 108. That is, the machine-trained model can detect the pedestrian 104 and the pedestrian object 108 and associated bounding regions with each of the detected objects. In at least one example, the machine-trained model can associate a bounding region 112 (or other indication) with the bounding region 106 and the bounding region 110, such that the bounding region 112 encompasses the bounding region 106 and the bounding region 110. That is, the bounding region 112 can indicate a pedestrian with object compound object, wherein the pedestrian 104 and the pedestrian object 108 are each associated with individual bounding regions within the bounding region 112.

In at least one example, the sensor data, and associated bounding regions (106, 110, and 112) can be provided to a prediction component and/or a planning component associated with the vehicle 102, as described below with reference to FIG. 4, to generate a trajectory for the vehicle 102 that traverses an environment 100 using the trajectory. That is, the bounding regions (106, 110, and 112) can be provided to downstream components of the vehicle 102 to control the vehicle 102. Additional details are provided below.

FIG. 2 illustrates an example process 200 for training a model for detecting pedestrian objects as described herein.

As described above, a vehicle can be associated with one or more sensor component(s) that can generate sensor data associated with an environment of the vehicle. One example of such sensor data can include lidar data. As an example, a vehicle can be associated with lidar sensors that are located at the corners, front, back, sides, and/or top of the vehicle. The lidar sensors can generate lidar data 202 associated with an environment of the vehicle. In at least one example, one or more vehicles can send the lidar data 202 to one or more computing devices associated with a training component. The lidar data 202 can be used for training model(s), as described below. As noted above, vehicles can be associated with additional or alternative sensor components, each of which can generate their own sensor data.

In some examples, the lidar data 202 can be lidar data processed by a perception component onboard a vehicle or the lidar data 202 can be raw lidar data that can be processed by one or more computing devices associated with a training component. In at least one example, a model (which can be provided to vehicle(s) for use onboard the vehicle(s)) can analyze raw lidar data to segment and classify objects. In an example, raw lidar data can be associated with a voxel space which can represent the lidar data in a grid of voxels in a three-dimensional space. With the lidar data represented in the voxel space, a machine-trained model can analyze the lidar data (represented in the voxel space) and output a mask associated with individual objects detected in the environment. In some examples, a mask can be represented in a plan view or top-down perspective (e.g., "top-down segmentation"). Lidar data that has been segmented and classified, such that individual objects are associated with masks, can be referred to as "processed lidar data." In some examples, lidar data can be associated with individual pixels or representations other than voxels, as described herein.

In FIG. 2, a portion of the lidar data 204 (e.g., processed lidar data) is illustrated in a top-down perspective. As illustrated, some of the voxels associated with the portion of the lidar data 204 are associated with a first mask (white fill) and some of the voxels associated with the portion of the lidar data 204 are associated with a second mask (black fill). The first mask (white fill) mask and the second mask (black fill) mask can be associated with different classifications of objects. For example, the first mask (white fill) mask can be associated with a pedestrian classification and the second mask (black fill) can be associated with an object classification.

In at least one example, the lidar data 202 (e.g., processed lidar data) can be provided to an annotation component 206. In at least one example, the annotation component 206 can receive or otherwise determine annotated data based at least in part on the lidar data 202. In at least one example, the annotation component 206 can receive annotated data 208 that includes a label associated with a pedestrian object system (e.g., pedestrian and pedestrian object compound object) and a label associated with a pedestrian. In at least one example, a "label" can be a bounding region, such as a bounding box, (or other indication) associated with the respective object or compound object. For example, as illustrated in FIG. 2, a first bounding region 210 is associated with the portion of the lidar data 204 associated with the pedestrian and pedestrian object system (e.g., the first mask (white fill) and second mask (black fill) voxels, in combination) and a second bounding region 212 is associated with the portion of the lidar data 204 associated with the pedestrian (e.g., the masked voxels associated with the white fill). In at least one example, the annotation component 206 can analyze the annotated data 208 using a machine-trained model. In such an example, the annotation component 206 can apply a geometric algorithm, an example of which is described below, such to subtract at least a portion of the annotated data 208 associated with the first bounding region 210 from a portion of the annotated data 208 associated with the second bounding region 212 to determine a portion of the annotated data 208 associated with the pedestrian object.

In at least one example, the annotation component 206 can take in two bounding regions (e.g., the first bounding region 210 and the second bounding region 212) and compute the major (e.g., longest) axis of the bounding region associated with the compound object (e.g., first bounding region 210). The annotation component 206 can then leverage heuristics to determine a position of the pedestrian object. For example, the annotation component 206 can assume that the pedestrian object is located between the second bounding region 212 associated with the pedestrian and the farthest edge of the first bounding region 210, along the major axis. The annotation component 206 can then construct the bounds of the pedestrian object based on the region between the farthest edge of the first bounding region 210 (and associated corners) and the second bounding region 212 associated with the pedestrian. The annotation component 206 can then associate the third bounding region 214 with the portion of the lidar data 204 associated with the pedestrian object.

In additional or alternative examples, the annotation component 206 can analyze the lidar data 204 to determine a position of a pedestrian object based at least in part on occupancy, for example.

In at least one example, the annotation component 206 can associate a third bounding region 214 with the portion of the lidar data 204 that is associated with the pedestrian object. That is, the annotation component 206 can annotate the portion of the lidar data 204 to indicate which voxels associated with the portion of the lidar data 204 are associated with the pedestrian object. As a result, the annotation component 206 can annotate the portion of the lidar data 204 to include the first bounding region 210 associated with the pedestrian and the third bounding region 214 associated with the pedestrian object. The resulting output 216 can therefore comprise lidar data associated with annotations labelling a pedestrian and an associated pedestrian object (e.g., the bounding region 210 and the bounding region 214).

In at least one example, training input data 218 can be provided to a training component 220. The training input data 218 can comprise output from the annotation component 206, such as the resulting output 216 described above with reference to FIG. 2. Furthermore, in some examples, the training input data 218 can be annotated via an additional or alternative annotation process than that described above. For instance, in some examples, the annotation component 206 can receive annotated data that includes an annotation (e.g., bounding region) associated with the pedestrian (e.g., the lidar data associated therewith) and an annotation (e.g., a bounding region) associated with the pedestrian object (e.g., the lidar data associated therewith). Such data can comprise the training input data 218. While a single resulting output 216 is illustrated, the training input data 218 can comprise aggregated data associated with various pedestrians and pedestrian objects.

In some examples, the training component 220 can receive the training input data 218 and can apply a loss weight mask to the training input data 218, such that voxels associated with pedestrian objects are weighted more than voxels associated with pedestrians and/or other objects. That is, in at least one example, a multiplicative mask can be applied to the training input data 218 to emphasize regions of the lidar data 202 associated with pedestrian objects. With reference to FIG. 2, the training component 220 can associate voxels that correspond to the pedestrian object (e.g., those associated with the bounding region 214) with a greater weight than the voxels that correspond to the pedestrian (e.g., those associated with the bounding region 210). In at least one example, this loss weight mask can enable a machine-trained model to learn a new classification associated with pedestrian objects, even though pedestrian objects are infrequently detected (e.g., when compared to vehicles, pedestrians, cyclists, and other objects) in environments of vehicles. In some examples, the pedestrian objects can be associated with different semantic classes (e.g., strollers, suitcases, umbrellas, large boxes, children (e.g., being held), motorcycles, carts, wheelchairs, etc.). The training component 220, however, when training the model 222 can merge pedestrian objects associated with the different semantic classes into a single classification of a pedestrian object.

In at least one example, the training component 220 can train a model 222 based at least in part on the training input data 218 to output a classification associated with pedestrian objects. In at least one example, the training component 220 can train data model(s) using machine learning techniques. For instance, in at least one example, a neural network can be trained using the training input data 218. As an example, the training component 220 can input the training input data 218 into the model 222. The model 222 can determine an output associated with an indication of a pedestrian object. The training component 220 can compare the output with the annotated data (e.g., the training input data 218) to determine a difference. In at least one example, the training component 220 can modify one or more parameters of the model based at least in part on the difference.

As described above, the resulting model 222 can output a classification associated with pedestrian objects, in addition to other objects including but not limited to pedestrians, vehicles, bicycles, and the like. That is, the training component 220 can train the model 222 for an additional output head that corresponds to pedestrian objects.

In at least one example, the model 222 can be provided to one or more vehicles 224, which can be configured to be controlled based at least in part on output(s) of the model 222. Additional details associated with using the model 222 are described below with reference to FIG. 3.

FIG. 3 illustrates an example process 300 for detecting pedestrian objects, and determining movement associated therewith, as described herein.

As described above with reference to FIG. 2, a vehicle can be associated with one or more sensor component(s) that can generate sensor data associated with an environment of the vehicle. One example of such sensor data can include lidar data 302 which can be associated with an environment of the vehicle. In at least one example, a perception component of a vehicle can receive lidar data 302 (e.g., from lidar sensors associated therewith), an example of a portion of which (e.g., the portion of lidar data 304) is illustrated in FIG. 3. As noted above, vehicles can be associated with additional or alternative sensor components, each of which can generate their own sensor data.

In at least one example, the lidar data 302 can input into the model 222, trained above with reference to FIG. 2. In at least one example, the model 222 can analyze the lidar data 302 and can output one or more observations 306. In at least one example, an observation can be an independent, contiguous segment of space that has been classified (e.g., by the model 222) into a particular class (e.g., associated with an object). In at least one example, one of the observation(s) 306 can be associated with a pedestrian. An enlarged view of the portion of the lidar data 304 is illustrated. The enlarged view 308 illustrates a plurality of voxels 310 associated with a first mask (white fill) indicating that the plurality of voxels 310 are associated with a pedestrian classification. The pedestrian can be associated with a bounding region 312 (or other indication).

In at least one example, each of the observation(s) 306 can be provided to a tracking component 314, whereby the tracking component 314 can utilize an indication of each of the observation(s) 306 for tracking the corresponding object(s) through time. That is, the tracking component 314 can iterate through each of the identified observation(s) 306 (and associated object) in an environment of the vehicle. Each observation, and associated object, can be associated with an indication 316(A)-316(N) (collectively, indications 316).

The indications 316, which are associated with different objects (e.g., object A-N) in an environment of the vehicle, can each be associated with a state 318(A)-318(N) (collectively, states 318). Each state can indicate whether a pedestrian object is associated with the pedestrian and, if a pedestrian object is associated with the pedestrian, information associated therewith. In at least one example, if a pedestrian is associated with a pedestrian object, the state can include information as described below. However, if a pedestrian is not associated with a pedestrian object, or an observation is not associated with a pedestrian (and thus, is not associated with a pedestrian object), the state can be empty or disabled.

In at least one example, the state can be associated with a first indication of whether the pedestrian is associated with a pedestrian object. The first indication, which can be a preliminary indication, and can be based on an output of the model 222. That is, as described above, the model 222 can detect a pedestrian object. If a pedestrian object is detected proximate the pedestrian, the state can be associated with the first (preliminary) indication of such.

In at least one example, a state can include a score indicative of a likelihood that a pedestrian is associated with a pedestrian object. In some examples, the score can be determined based at least in part on analyzing one or more portions of (e.g., lidar) data received over time and modifying the score based on whether an instance of a pedestrian object is detected proximate to (e.g., with a threshold distance of) the pedestrian. That is, the score can be persistent over time, so that the score can provide an accurate signal regarding the presence (or absence) of a pedestrian object (e.g., when compared to a single output of the model 222 at a particular instance). In at least one example, if the score is greater than or equal to a threshold, the tracking component 314 can associate a second indication (e.g., a confident indication) with the state to confirm that a pedestrian object is associated with the pedestrian. Such a second indication, in some examples, can be a Boolean indication (e.g., true or false). Additional details associated with determining scores are described below with reference to FIGS. 7-8.

In some examples, an object can be detected by the model 222 but may not be classified as a pedestrian object. In such an example, the tracking component 314 can analyze one or more additional criteria to determine that an object is a pedestrian object before associating the second indication (e.g., the confident indication) with the state. In at least one example, the tracking component 314 can consider (i) an area intersection ratio, (ii) whether the detected object overlaps a detected pedestrian, and (iii) whether the object is classified as a pedestrian. In at least one example, the area intersection ratio can represent an extent to which a best guess associated with a pedestrian object overlaps a current detection of an object. If the area intersection ratio is greater than or equal to a threshold, the tracking component 314 can associate the confident indication with the state (so long as the other two criteria are satisfied). In at least one example, if the detected object overlaps a detected pedestrian, the tracking component 314 can refrain from associating the confident indication with the state. That is, the tracking component 314 can associate the confident indication with the state so long as the detected object does not overlap a detected pedestrian (e.g., the indication of which the state is associated) (so long as the other two criteria are satisfied). Moreover, so long as the object is not classified as a pedestrian, the tracking component 314 can associate the confident indication with the state (so long as the other two criteria are satisfied). That is, in at least one example, if the detected object is classified as a pedestrian, the tracking component 314 can refrain from associating the confident indication with the state. In some examples, if the state is associated with the confident indication, indicating that an object is associated with a pedestrian (and is therefore a pedestrian object), such a classification can override the original classification output by the model 222.

In at least one example, a state can be associated with one or more poses of a pedestrian object, which can include an output position (e.g., based on the model 222) and/or an estimated position (e.g., which can include the output position but occupy more space than the output position). In some examples, the estimated position can be a recurrent average of a current observation and one or more previous observations, which can be determined by using an exponentially weighted moving average that is computed relative to a pose of the pedestrian. In some examples, the estimated position may not be determined (e.g., if a noise metric associated with the model 222 is below a threshold). Additional details associated with determining states and associated positions are described below with reference to FIG. 6.

In some examples, the tracking component 314 can associate a kinematic model with the state. Such a kinematic model (e.g., associated with a pedestrian object) can be based at least in part on a kinematic model associated with the pedestrian. In at least one example, the tracking component 314 can determine the kinematic model for the pedestrian object based on a characteristic of the pedestrian object (e.g., a mass of the pedestrian object, a density of the pedestrian object, a semantic attribute of the pedestrian object, etc.). In at least one example, the kinematic modelling can be useful for propagating a previous observation forward to determine overlap with a current observation (e.g., of the observation(s) 306), and if a previous observation and current observation overlap, associating the observations. That is, in some examples, the tracking component 314 can utilize the kinematic model for associating the objects (e.g., the pedestrian and the pedestrian object) in new sensor data (e.g., lidar data) received over time (e.g., for tracking the objects over time).

In at least one example, if a state indicates that a pedestrian is associated with a pedestrian object, the tracking component 314 can associate a bounding region (or other indication) with the portion of the lidar data 304 that corresponds to the pedestrian object. In FIG. 3, a bounding region 320 is shown in association with a plurality of voxels 322 that are associated with a second mask (black fill) (e.g., indicating an object). In at least one example, based at least in part on detecting a pedestrian and a pedestrian object, the tracking component 313 can associate a bounding region 324 with the pedestrian and the pedestrian object. That is, the tracking component 314 can output a bounding region 324 that encompasses the bounding region 312 and the bounding region 320. The bounding region 324 can represent a compound object (e.g., the pedestrian/pedestrian object system). In at least one example, the indication of the object (e.g., the bounding regions 312, 320, and 324) and associated state 326 can be provided to one or more other vehicle component(s) 328, which can include a prediction component and/or a planning component. Additional details associated with the prediction component and/or the planning component are described below with reference to FIG. 4.

Figure 4:
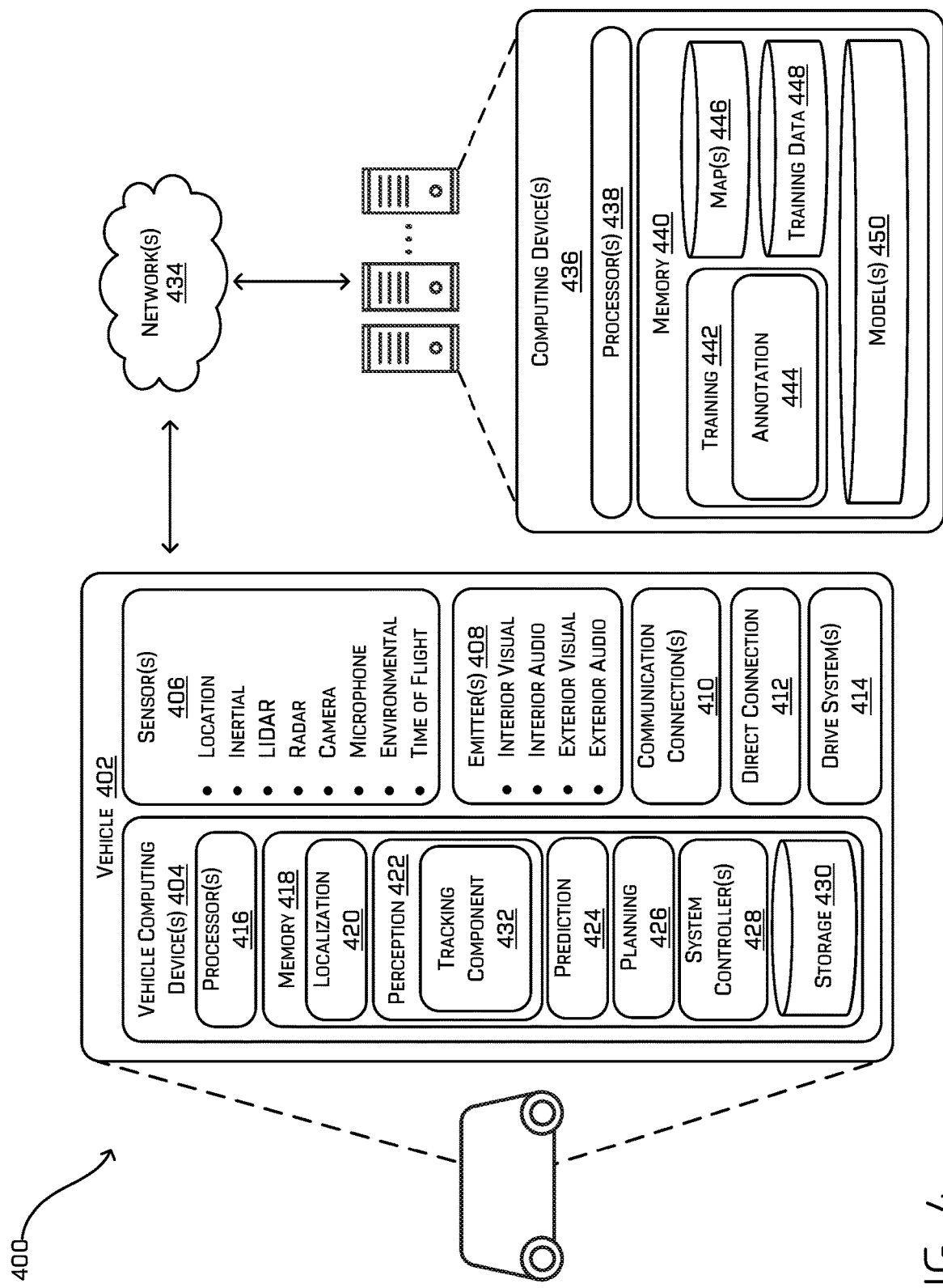
FIG. 4 is a block diagram illustrating an example system for performing techniques described herein.

FIG. 4 is a block diagram illustrating an example system 400 for performing techniques, as described herein. In at least one example, a vehicle 402, which can correspond to the vehicle 102 described above with reference to FIG. 1, can include one or more vehicle computing devices 404, one or more sensor components 406, one or more emitters 408, one or more communication connections 410, at least one direct connection 412, and one or more drive systems 414. As described above, the vehicle 402 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 402 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 402 is an autonomous vehicle; however, the vehicle 402 could be any other type of vehicle. While only a single vehicle 402 is illustrated in FIG. 4, in a practical application, the example system 400 can include a plurality of vehicles, which, in some examples, can comprise a fleet of vehicles.

The vehicle computing device(s) 404 can include processor(s) 416 and memory 418 communicatively coupled with the processor(s) 416. In the illustrated example, the memory 418 of the vehicle computing device(s) 404 stores a localization component 420, a perception component 422, a prediction component 424, a planning component 426, and one or more system controllers 428. Additionally, the memory 418 can include a storage 430, which can store map(s), model(s), previous outputs, etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine learned models, as described below. In some examples, the storage 430 can store previous outputs.

In at least one example, the localization component 420 can determine a pose (position and orientation) of the vehicle 402 in relation to a local and/or global map based at least in part on sensor data received from the sensor component(s) 406 and/or map data associated with a map (e.g., of the map(s)). In at least one example, the localization component 420 can include, or be associated with a calibration component that is capable of performing operations for calibrating (determining various intrinsic and extrinsic parameters associated with any one or more of the sensor component(s) 406), localizing, and mapping substantially simultaneously.

In at least one example, the perception component 422 can perform object detection, segmentation, and/or classification based at least in part on sensor data received from the sensor component(s) 406. In at least one example, the perception component 422 can receive raw sensor data (e.g., from the sensor component(s) 406). In at least one example, the perception component 422 can receive sensor data and can utilize one or more processing algorithms to perform object detection, segmentation, and/or classification with respect to object(s) identified in the sensor data. In some examples, the perception component 422 can associate a bounding region (or otherwise an instance segmentation) with an identified object and can associate a confidence score associated with a classification of the identified object with the identified object. In some examples, objects, when rendered via a display, can be colored based on their perceived class. While techniques described herein are described relative to lidar data, the perception component 422 can perform similar processes for one or more sensor modalities, including but not limited to image data, lidar data, etc.

In at least one example, the perception component 422 can include a tracking component 432. The tracking component 432 can correspond to the tracking component 314 described above with reference to FIG. 3. In at least one example, the tracking component 432 can receive observation(s) associated with sensor data. Each observation can be associated with an object detected in the environment of the vehicle 402. In at least one example, the tracking component 432 can determine whether such observations are associated with other objects (e.g., a pedestrian object) and can determine indications of object(s) that can be provided to other component(s) associated with the vehicle computing device(s) 404.

The prediction component 424 can receive sensor data from the sensor component(s) 406, map data associated with a map (e.g., of the map(s) which can be in storage 430), and/or perception data output from the perception component 422 (e.g., processed sensor data), and can output predictions associated with one or more objects within the environment of the vehicle 402. In at least one example, the planning component 426 can determine outputs, to use to control the vehicle 402 based at least in part on sensor data received from the sensor component(s) 406, map data, and/or any determinations made by the other components of the vehicle 402.

Additional details of localization components, perception components, prediction components, and/or planning components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 402 is not an autonomous vehicle), one or more of the aforementioned components can be omitted from the vehicle 402. While the components described above are illustrated as "onboard" the vehicle 402, in other implementations, the components can be remotely located and/or accessible to the vehicle 402. Furthermore, while the components are described above as "components," such components can comprise one or more components, which can be part of a system, for performing operations attributed to each of the components.

In at least one example, the localization component 420, the perception component 422, the prediction component 424, and/or the planning component 426 can process sensor data, as described above, and can send their respective outputs over network(s) 434, to computing device(s) 436. In at least one example, the localization component 420, the perception component 422, the prediction component 424, and/or the planning component 426 can send their respective outputs to the computing device(s) 436 at a particular frequency, after a lapse of a predetermined period of time, in near real-time, etc.

In at least one example, the vehicle computing device(s) 404 can include one or more system controllers 428, which can be configured to control steering, propulsion, braking, safety, emitters, communication, and other systems of the vehicle 402. These system controller(s) 428 can communicate with and/or control corresponding systems of the drive system(s) 414 and/or other systems of the vehicle 402.

In at least one example, the sensor component(s) 406 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 406 can provide input to the vehicle computing device(s) 404. In some examples, the sensor component(s) 406 can preprocess at least some of the sensor data prior to sending the sensor data to the vehicle computing device(s) 404. In at least one example, the sensor component(s) 406 can send sensor data, via the network(s) 434, to the computing device(s) 436 at a particular frequency, after a lapse of a predetermined period of time, in near real-time, etc.

The vehicle 402 can also include one or more emitters 408 for emitting light and/or sound, as described above. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 408 can be positioned at various locations about the exterior and/or interior of the vehicle 402.

The vehicle 402 can also include communication connection(s) 410 that enable communication between the vehicle 402 and other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communications connection(s) 410 also enable the vehicle 402 to communicate with a remote teleoperations computing device or other remote services.

The communications connection(s) 410 can include physical and/or logical interfaces for connecting the vehicle computing device(s) 404 to another computing device or a network, such as network(s) 434. For example, the communications connection(s) 410 can enable Wi-Fi-based communication such as via frequencies defined by the IEEE 802.11 standards, short range wireless frequencies such as BLUETOOTH, or any suitable wired or wireless communications protocol that enables the respective computing device to interface with the other computing device(s).

The direct connection 412 can directly connect the drive system(s) 414 and other systems of the vehicle 402.

In at least one example, the vehicle 402 can include drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include sensor component(s) to detect conditions of the drive system(s) 414 and/or the surroundings of the vehicle 402. By way of example and not limitation, the sensor component(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 414. In some cases, the sensor component(s) on the drive system(s) 414 can overlap or supplement corresponding systems of the vehicle 402 (e.g., sensor component(s) 406).

The drive system(s) 414 can include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive module controller which can receive and preprocess data from the sensor component(s) and to control operation of the various vehicle systems. In some examples, the drive module controller can include processor(s) and memory communicatively coupled with the processor(s). The memory can store one or more modules to perform various functionalities of the drive system(s) 414. Furthermore, the drive system(s) 414 also include communication connection(s) that enable communication by the respective drive module with other local or remote computing device(s).

In FIG. 4, the vehicle computing device(s) 404, sensor component(s) 406, emitter(s) 408, and the communication connection(s) 410 are shown onboard the vehicle 402. However, in some examples, the vehicle computing device(s) 404, sensor component(s) 406, emitter(s) 408, and the communication connection(s) 410 can be implemented outside of an actual vehicle (i.e., not onboard the vehicle 402).

As described above, the vehicle 402 can send sensor data to the computing device(s) 436, via the network(s) 434. In some examples, the vehicle 402 can send raw sensor data to the computing device(s) 436. In other examples, the vehicle 402 can send processed sensor data and/or representations of sensor data to the computing device(s) 436 (e.g., data output from the localization component 420, the perception component 422, the prediction component 424, and/or the planning component 426). In some examples, the vehicle 402 can send sensor data to the computing device(s) 436 at a particular frequency, after a lapse of a predetermined period of time, in near real-time, etc.

The computing device(s) 436 can receive the sensor data (raw or processed) from the vehicle 402 and/or other data collection devices, as well as data from one or more third party sources and/or systems. In at least one example, the computing device(s) 436 can include processor(s) 438 and memory 440 communicatively coupled with the processor(s) 438. In the illustrated example, the memory 440 of the computing device(s) 436 stores a training component 442, which can include an annotation component 444, a map(s) storage 446 (e.g., storing one or more maps), a training data storage 448 (e.g., storing training data accessible to the training component 442), and a model(s) storage 450 (e.g., models output by the training component 442). In some examples, one or more of the systems and/or storage repositories can be associated with the vehicle 402 or other computing device(s) associated with the system 400 instead of, or in addition to, being associated with the memory 440 of the computing device(s) 436.

In at least one example, the training component 442 can train data model(s), which can be used for various operations as described herein. The training component 442 can correspond to the training component 220 described above with reference to FIG. 2 and the annotation component 444 can correspond to the annotation component 206 described above with reference to FIG. 2. Details associated with each of the components are described above with reference to FIG. 2.

As described above with reference to FIG. 2, the training component 442 can train a model based at least in part on training input data (e.g., received from the annotation component 444) to output a classification associated with pedestrian objects. In at least one example, the training component 442 can train data model(s) using machine learning techniques. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. The resulting data model(s) can be stored in the model(s) storage 450 and/or the storage 430 on the vehicle 402 and can be accessed by in near real-time by one or more components of the vehicle computing device(s) 404.

The processor(s) 416 of the vehicle 402 and the processor(s) 438 of the computing device(s) 436 can be any suitable processor capable of executing instructions to process data and perform operations as described herein. By way of example and not limitation, the processor(s) 416 and 438 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 440 are examples of non-transitory computer-readable media. Memory 418 and 440 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in some examples, components of the vehicle 402 can be associated with the computing device(s) 436 and/or the components of the computing device(s) 436 can be associated with the vehicle 402. That is, the vehicle 402 can perform one or more of the functions associated with the computing device(s) 436, and vice versa.

FIGS. 5-8 are flowcharts showing example processes involving techniques as described herein. The processes illustrated in FIGS. 5-8 are described with reference to the system 400 shown in FIG. 4 for convenience and ease of understanding. However, the processes illustrated in FIGS. 5-8 are not limited to being performed using the system 400. Moreover, the system 400 described herein is not limited to performing the processes illustrated in FIGS. 5-8.

The processes 500-800 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 500-800 can be combined in whole or in part with each other or with other processes.

Figure 5:
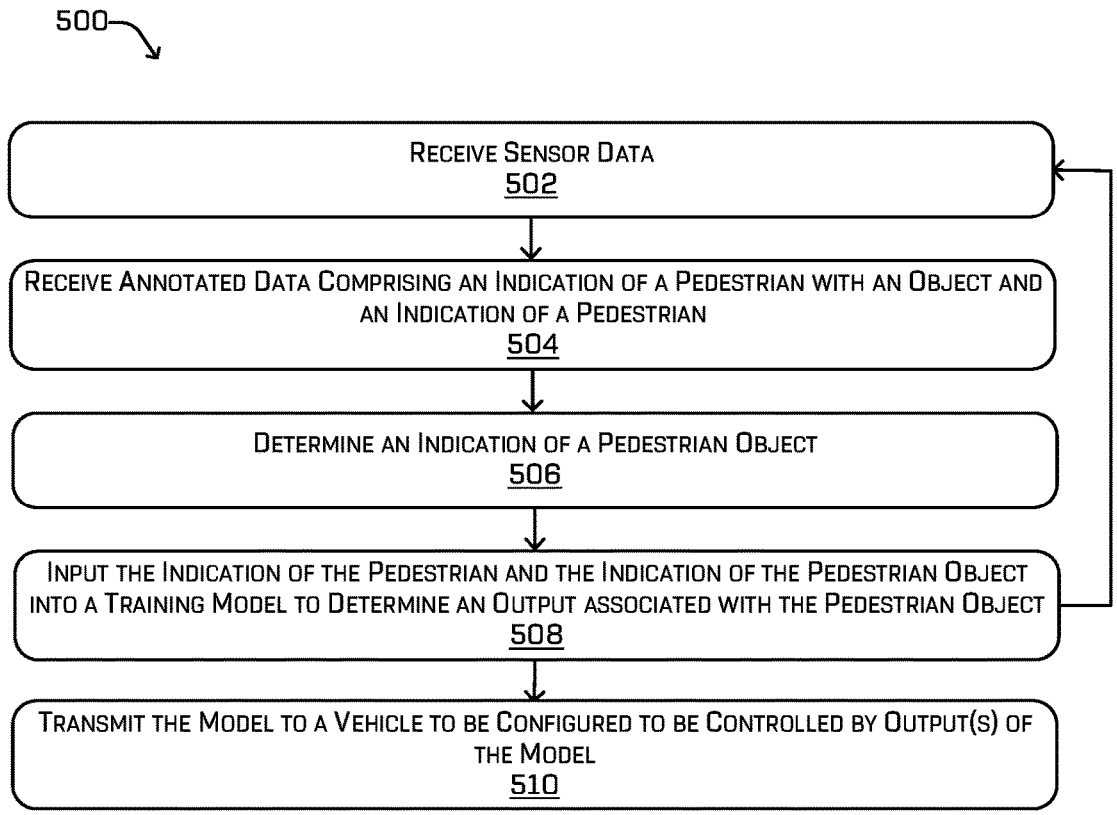
FIG. 5 illustrates an example process for training a model for detecting pedestrian objects as described herein.

FIG. 5 illustrates an example process 500 for training a model for detecting pedestrian objects as described herein.

Block 502 illustrates receiving sensor data. As described above, a vehicle 402 can be associated with one or more sensor component(s) 406 that can generate sensor data associated with an environment of the vehicle 402. One example of such sensor data can include lidar data. In at least one example, one or more vehicles can send lidar data to the computing device(s) 436 via the network(s) 434. As described above, in some examples, the lidar data can be lidar data processed by a perception component 422 onboard the vehicle 402 and/or the lidar data can be raw lidar data that can be processed by the computing device(s) 436. In at least one example, a model (which can be provided to vehicle(s) for use onboard the vehicle(s) and/or used by the computing device(s) 436) can analyze raw lidar data to segment and classify objects. In an example, raw lidar data can be associated with a voxel space which can represent the lidar data in a grid of voxels in a three-dimensional space.

With the lidar data represented in the voxel space, a machine-trained model can analyze the lidar data (represented in the voxel space) and output a mask associated with individual objects detected in the environment. In some examples, a mask can be represented in a plan view or top-down perspective (e.g., "top-down segmentation"). Lidar data that has been segmented and classified, such that individual objects are associated with masks, can be referred to as "processed lidar data." In some examples, lidar data can be associated with individual pixels or representations other than voxels, as described herein.

Block 504 illustrates receiving annotated data comprising an indication of a pedestrian with an object and an indication of a pedestrian. In at least one example, the lidar data (e.g., processed lidar data) can be provided to an annotation component 444 associated with a training component 442. In at least one example, the annotation component 444 can receive or otherwise determine annotated data based at least in part on the lidar data. In at least one example, the annotation component 444 can receive annotated data that includes a label associated with a pedestrian object system (e.g., pedestrian and pedestrian object compound object) and a label associated with a pedestrian. In at least one example, a "label" can be a bounding region (or other indication) associated with the respective object or compound object.

Block 506 illustrates determining an indication of a pedestrian object. In at least one example, the annotation component 444 can analyze the annotated data using a machine-trained model. In such an example, the annotation component 444 can apply a geometric algorithm such to subtract at least a portion of the annotated data associated with the first bounding region from a portion of the annotated data associated with the second bounding region to determine a portion of the annotated data associated with the pedestrian object.

In at least one example, the annotation component 444 can associate a third bounding region with the portion of the lidar data that is associated with the pedestrian object. That is, the annotation component 444 can annotate the portion of the lidar data to indicate which voxels associated with the portion of the lidar data are associated with the pedestrian object. As a result, the annotation component 444 can annotate the portion of the lidar data to include the first bounding region associated with the pedestrian and the third bounding region associated with the pedestrian object. The resulting output can therefore comprise lidar data associated with annotations labelling a pedestrian and an associated pedestrian object.

As described above, additional or alternative annotation processes can be leveraged to determine an annotation, indication, or other label associated with a pedestrian and an annotation, indication, or other label associated with a pedestrian object.

Block 508 illustrates inputting the indication of the pedestrian and the indication of the pedestrian object into a model to determine an output associated with the pedestrian object. In at least one example, training input data can be provided to a training component 442. The training input data can comprise output from the annotation component 444, which can include lidar data that is labeled with bounding regions, or other indications, associated with pedestrians and pedestrian objects.

In some examples, the training component 442 can receive the training input data and can apply a loss weight mask to the training input data, such that voxels associated with pedestrian objects are weighted more than voxels associated with pedestrians and/or other objects. That is, in at least one example, a multiplicative mask can be applied to the training input data to emphasize regions of the lidar data associated with pedestrian objects. In at least one example, this loss weight mask can enable a machine-trained model to learn a new classification associated with pedestrian objects, even though pedestrian objects are infrequently detected (e.g., when compared to vehicles, pedestrians, cyclists, and other objects) in environments of vehicles. In some examples, the pedestrian objects can be associated with different semantic classes (e.g., strollers, suitcases, umbrellas, large boxes, children, motorcycles, carts, wheelchairs, etc.). The training component 442, however, when training the model can merge pedestrian objects associated with the different semantic classes into a single classification of a pedestrian object.

In at least one example, the training component 442 can train a model based at least in part on the training input data to output a classification associated with pedestrian objects. In at least one example, the training component 442 can train data model(s) using machine learning techniques. For instance, in at least one example, a neural network can be trained using the training input data. As an example, the training component 442 can input the training input data into the model. The model can determine an output associated with an indication of a pedestrian object. The training component 442 can compare the output with the annotated data (e.g., the training input data) to determine a difference. In at least one example, the training component 442 can modify one or more parameters of the model based at least in part on the difference.

As described above, the resulting model can output a classification associated with pedestrian objects, in addition to other objects including but not limited to pedestrians, vehicles, bicycles, and the like. That is, the training component 442 can train the model for an additional output head that corresponds to pedestrian objects.

In some examples, process 500 can return to block 502 to receive new sensor data and update the model based at least in part on the newly received sensor data.

Block 510 illustrates transmitting the model to a vehicle that is configured to be controlled by output(s) of the model. In at least one example, the model can be provided to one or more vehicles, which can be configured to be controlled based at least in part on output(s) of the model. For example, the model can be transmitted from the computing device(s) 436 to the vehicle 402 (e.g., via the network(s) 434) and can be stored in the storage 430 associated with the vehicle 402. As such, the perception component 422 can access the model for analyzing incoming lidar data (e.g., from the sensor component(s) 406) in near real-time for controlling the vehicle 402. The model can be provided to one or more additional vehicles for similar use.

While FIG. 5 describes detecting pedestrians and pedestrian objects for training a model to detect a new object class: pedestrian objects, techniques described herein may be applied to any number of types of objects and associated objects that are attached to respective objects (e.g., the other respective objects control the motion of the associated objects) and modify geometries of the other respective objects. For example, techniques described herein can be applicable to detecting an open door of a vehicle, a child carrier attached to a bicycle, or the like. That is, techniques described herein should not be construed as being limited to the detection of pedestrians and pedestrian objects.

Furthermore, while techniques described herein are directed to analyzing lidar data and training a model for detecting pedestrian objects, techniques described herein can be applicable to additional or alternative types of sensor data including, but not limited to, image data, sonar data, radar data, and the like.

Figure 6:
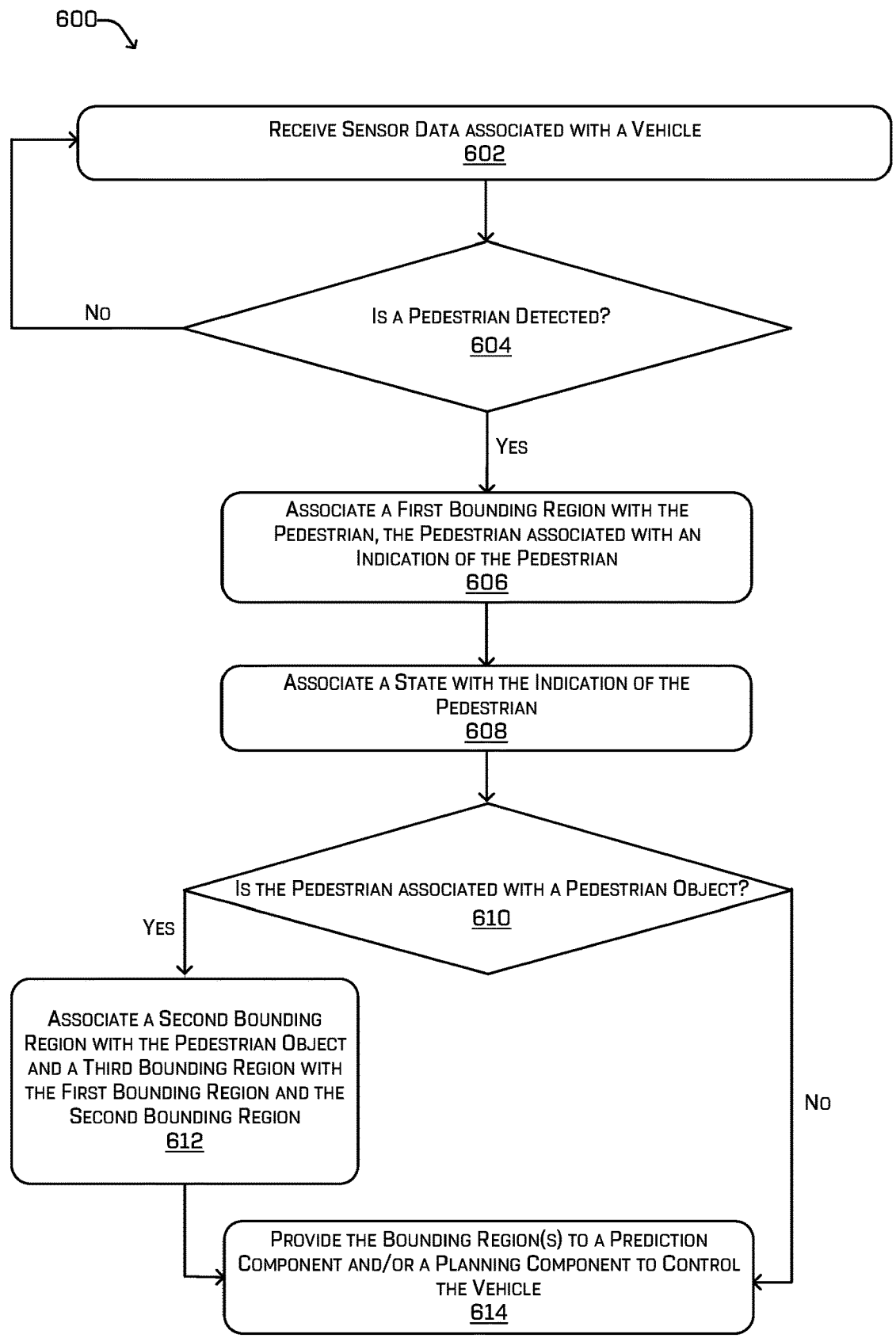
FIG. 6 illustrates an example process for detecting pedestrian objects as described herein.

FIG. 6 illustrates an example process 600 for detecting pedestrian objects as described herein.

Block 602 illustrates receiving sensor data associated with a vehicle. As described above, a vehicle 402 can be associated with one or more sensor component(s) 406 that can generate sensor data associated with an environment of the vehicle. One example of such sensor data can include lidar data which can be associated with an environment of the vehicle 402. In at least one example, a perception component 422 of the vehicle 402 can receive lidar data (e.g., from lidar sensors associated therewith). As noted above, vehicles can be associated with additional or alternative sensor components, each of which can generate their own sensor data.

Block 604 illustrates determining whether a pedestrian is detected. In at least one example, the lidar data can input into the model, trained above with reference to FIG. 5. In at least one example, the model can analyze the lidar data and can output one or more observations. In at least one example, an observation can be an independent, contiguous segment of space that has been classified (e.g., by the model) into a particular class (e.g., associated with an object). In at least one example, one of the observation(s) can be associated with a pedestrian. In at least one example, the lidar data associated with the pedestrian can be associated with a bounding region (or other indication). If a pedestrian is not detected in the lidar data, process 600 can return to block 602.

Block 606 illustrates associating a first bounding region with the pedestrian, the pedestrian associated with an indication of the pedestrian. In at least one example, based at least in part on a pedestrian being detected, the perception component 422 can associate a bounding region, or other indication, with the portion of the lidar data corresponding to the pedestrian. Furthermore, each of the observation(s) can be provided to a tracking component 432, whereby the tracking component 432 can associate an indication of each of the observation(s) with each of the observation(s) for tracking the corresponding object(s) through time. That is, the tracking component 432 can iterate through each of the identified observation(s) (and associated object) in an environment of the vehicle 402. Each observation, and associated object, can be associated with an indication.

Block 608 illustrates associating a state with the indication of the pedestrian. In at least one example, a state can indicate whether a pedestrian object is associated with the pedestrian and, if a pedestrian object is associated with the pedestrian, information associated therewith. However, if a pedestrian is not associated with a pedestrian object, or an observation is not associated with a pedestrian (and thus, is not associated with a pedestrian object), the state can be empty or disabled.

Block 610 illustrates determining whether the pedestrian is associated with a pedestrian object. In at least one example, the model, described above, can detect a pedestrian object. If the pedestrian object is within a threshold distance of the pedestrian, the tracking component 432 can determine that the pedestrian is associated with a pedestrian object. In at least one example, the tracking component 432 can associate a first indication that the pedestrian is associated with a pedestrian object with the state. The first indication, which can be a preliminary indication, and can be based on an output of the model. That is, as described above, the model can detect a pedestrian object. If a pedestrian object is detected proximate the pedestrian, the state can be associated with the first (preliminary) indication of such.

In at least one example, the state can additionally include a score indicative of a likelihood that a pedestrian is associated with a pedestrian object. In some examples, the score can be determined based at least in part on analyzing one or more portions of the sensor data (e.g., lidar data) received over time and modifying the score based on whether an instance of a pedestrian object is detected proximate to (e.g., with a threshold distance of) the pedestrian. That is, the score can be persistent over time, so that the score can provide an accurate signal regarding the presence (or absence) of a pedestrian object (e.g., when compared to a single output of the model at a particular instance). In at least one example, if the score is greater than or equal to a threshold, the tracking component 432 can associate a second indication (e.g., a confident indication) with the state to confirm that a pedestrian object is associated with the pedestrian. Such a second indication, in some examples, can be a Boolean indication (e.g., true or false). Additional details associated with determining scores are described below with reference to FIGS. 7-8.

In some examples, an object can be detected by the model but may not be classified as a pedestrian object. In such an example, the tracking component 432 can analyze one or more additional criteria to determine that an object is a pedestrian object before associating the second indication (e.g., the confident indication) with the state. In at least one example, the tracking component 432 can consider (i) an area intersection ratio, (ii) whether the detected object overlaps a detected pedestrian, and (iii) whether the object is classified as a pedestrian. In at least one example, the area intersection ratio can represent an extent to which a best guess associated with a pedestrian object overlaps a current detection of an object. If the area intersection ratio is greater than or equal to a threshold, the tracking component 432 can associate the confident indication with the state (so long as the other two criteria are satisfied). In at least one example, if the detected object overlaps a detected pedestrian, the tracking component 432 can refrain from associating the confident indication with the state. That is, the tracking component 432 can associate the confident indication with the state so long as the detected object does not overlap a detected pedestrian (e.g., the indication of which the state is associated) (so long as the other two criteria are satisfied). Moreover, so long as the object is not classified as a pedestrian, the tracking component 432 can associate the confident indication with the state (so long as the other two criteria are satisfied). That is, in at least one example, if the detected object is classified as a pedestrian, the tracking component 432 can refrain from associating the confident indication with the state. In some examples, if the state is associated with the confident indication, indicating that an object is associated with a pedestrian (and is therefore a pedestrian object), such a classification can override the original classification output by the model.

In some examples, the tracking component 432 can associate a kinematic model with the state. Such a kinematic model (e.g., associated with a pedestrian object) can be based at least in part on a kinematic model associated with the pedestrian. In at least one example, the tracking component 432 can determine the kinematic model for the pedestrian object based on a characteristic of the pedestrian object (e.g., a mass of the pedestrian object, a density of the pedestrian object, a semantic attribute of the pedestrian object, etc.). In at least one example, the kinematic modelling can be useful for propagating a previous observation forward to determine overlap with a current observation (e.g., of the observation(s) 306), and if a previous observation and current observation overlap, associating the observations. That is, in some examples, the tracking component 314 can utilize the kinematic model for associating the objects (e.g., the pedestrian and the pedestrian object) in new sensor data received over time (e.g., for tracking the objects over time).

Furthermore, in at least one example, a state can be associated with one or more poses of a pedestrian object, which can include an output position (e.g., based on the model) and/or an estimated position (e.g., which can include the output position but occupy more space than the output position). In some examples, the estimated position can be a recurrent average of a current observation and one or more previous observations, which can be determined by using an exponentially weighted moving average that is computed relative to a pose of the pedestrian. In some examples, the estimated position may not be determined (e.g., if a noise metric associated with the model is below a threshold).

Block 612 illustrates associating a second bounding region with the pedestrian object and a third bounding region with the first bounding region (e.g., associated with the pedestrian) and the second bounding region (e.g., associated with the pedestrian object). In at least one example, if the tracking component 432 determines that the state is associated with the confident indication, the tracking component 432 can determine that pedestrian is associated with a pedestrian object. In at least one example, if the pedestrian is associated with a pedestrian object (e.g., the state is associated with an indication of such), the tracking component 432 can associate a second bounding region with the pedestrian object and a third bounding region with the first bounding region (e.g., associated with the pedestrian) and the second bounding region (e.g., associated with the pedestrian object). That is, in at least one example, if a state indicates that a pedestrian is associated with a pedestrian object, the tracking component 432 can associate a bounding region (or other indication) with the portion of the lidar data that corresponds to the pedestrian object. In at least one example, based at least in part on detecting a pedestrian and a pedestrian object, the tracking component 432 can associate a bounding region with the pedestrian and the pedestrian object. That is, the tracking component 432 can output a bounding region that encompasses the first bounding region (e.g., associated with the pedestrian) and the second bounding region (e.g., associated with the pedestrian object). The bounding region can represent a compound object (e.g., the pedestrian/pedestrian object system).

Block 614 illustrates providing the bounding region(s) to a prediction component and/or a planning component to control the vehicle. In at least one example, based at least in part on the tracking component 432 associating the first, second, and third bounding regions with the lidar data, the tracking component 432 can send an indication of the indication of the pedestrian/pedestrian object system to one or more other vehicle component(s), which can include a prediction component 424 and/or a planning component 426. In at least one example, the bounding region(s) can be associated with state information, which can include one or more poses of a pedestrian object. As described above, position information (associated with a pose) can include an output position (e.g., based on the model) and/or an estimated position (e.g., which can include the output position but occupy more space than the output position). In some examples, the estimated position can be a recurrent average of a current observation and one or more previous observations, which can be determined by using an exponentially weighted moving average that is computed relative to a pose of the pedestrian. In some examples, the estimated position may not be determined (e.g., if a noise metric associated with the model is below a threshold).

If no pedestrian object is detected, the tracking component 432 can send the lidar data, associated with a bounding region corresponding to a pedestrian (e.g., the first bounding region), to the prediction component 424 and/or the planning component 426.

As described above, the prediction component 424 and/or the planning component 426 can determine trajectories for controlling the vehicle 402.

Figure 7:
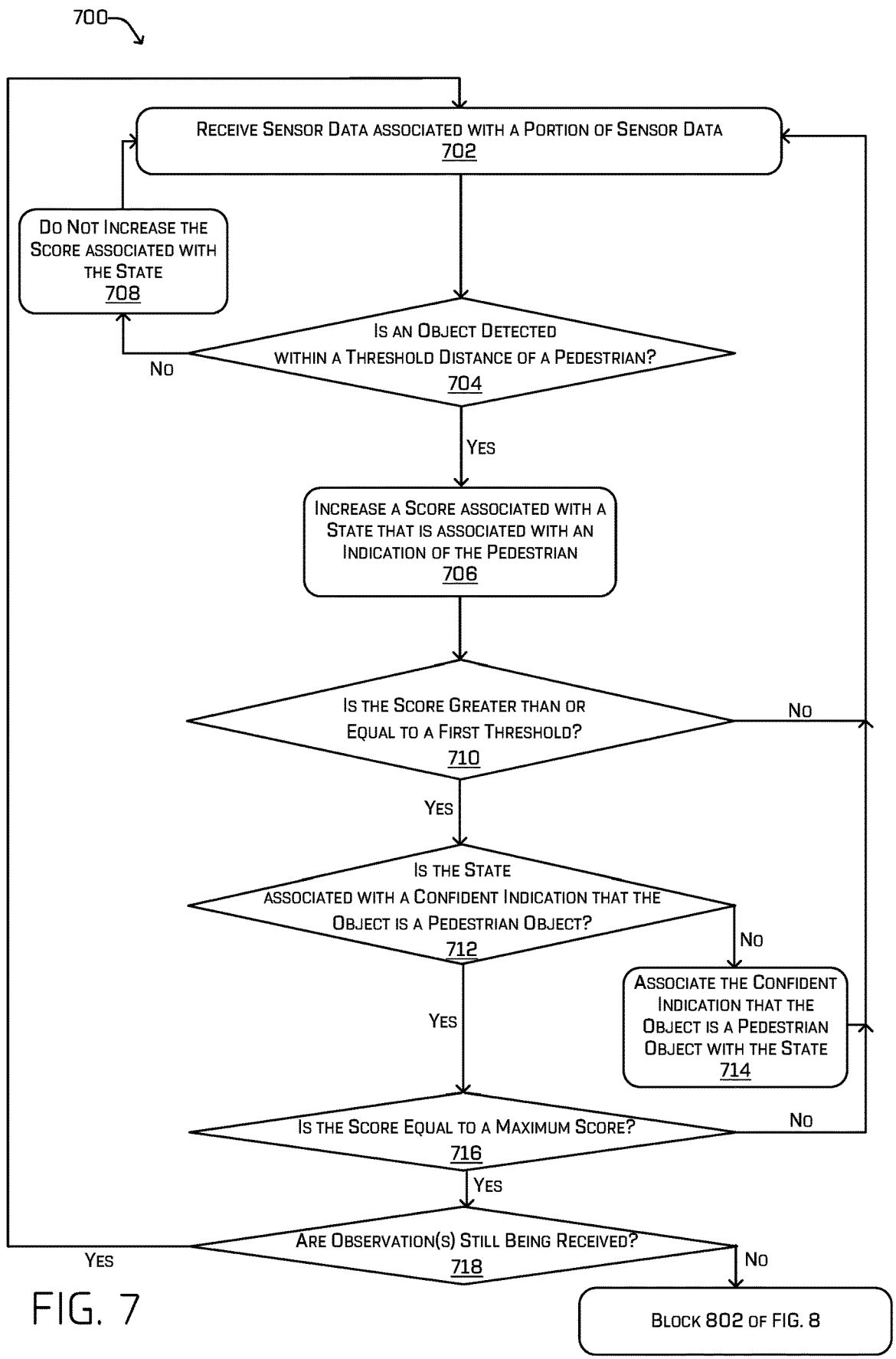
FIG. 7 illustrates an example process for determining whether a pedestrian object is associated with a pedestrian as described herein.

FIG. 7 illustrates an example process 700 for determining whether a pedestrian object is associated with a pedestrian as described herein. As described above, in some examples, the model (trained as described above) can output an indication that a pedestrian is associated with the pedestrian object. In at least one example, the score described below can be used as a confirmation that an object is a pedestrian object, in an effort to ensure accurate decision-making by the vehicle computing device(s) 404.

Block 702 illustrates receiving sensor data associated with a portion of sensor data. As described above, a vehicle 402 can be associated with one or more sensor component(s) 406 that can generate sensor data associated with an environment of the vehicle. One example of such sensor data can include lidar data which can be associated with an environment of the vehicle 402. In at least one example, a perception component 422 of the vehicle 402 can receive lidar data (e.g., from lidar sensors associated therewith). As noted above, vehicles can be associated with additional or alternative sensor components, each of which can generate their own sensor data. In at least one example, sensor data can be received in over time. For example, in some examples, a portion of lidar data can be associated with a defined time or rotation associated with capturing lidar data. Such portions of sensor data received over time can be provided to the perception component 422 in near real-time.

Block 704 illustrates determining whether an object is detected within a threshold distance of a pedestrian. As described above with reference to blocks 604 and 606 of FIG. 6, in at least one example, lidar data, for example, can be input into the model, trained as described above with reference to FIG. 5. In at least one example, the model can analyze the lidar data and can output one or more observations. In at least one example, an observation can be an independent, contiguous segment of space that has been classified (e.g., by the model) into a particular class (e.g., associated with an object). In at least one example, one of the observation(s) can be associated with a pedestrian. In at least one example, the lidar data associated with the pedestrian can be associated with a bounding region (or other indication). In at least one example, each of the observation(s) can be provided to a tracking component 432 associated with the perception component 422, whereby the tracking component 432 can associate an indication of each of the observation(s) with each of the observation(s) for tracking the corresponding object(s) through time. That is, the tracking component 432 can iterate through each of the identified observation(s) (and associated object(s)) in an environment of the vehicle 402. Each observation, and associated object, can be associated with an indication.

In at least one example, the tracking component 432 can analyze a portion of lidar data to determine whether an object is detected within a threshold distance of the pedestrian. Based at least in part on determining that an object is detected within the threshold distance of the pedestrian, the tracking component 432 can increase a score associated with a state that is associated with the indication of the pedestrian, as illustrated in block 706. In at least one example, a state associated with an indication of a pedestrian can begin with a score of 0.0. Each time an object is detected within the threshold distance of the pedestrian, the tracking component 432 can increase the score by an amount.

In at least one example, if an object is not detected and/or is detected but is not within a threshold distance of the pedestrian, the tracking component 432 can refrain from increasing the score associated with the state, as illustrated in block 708. In some examples, if an object is not detected and/or is detected but is not within a threshold distance of the pedestrian, the tracking component 432 can reduce the score (e.g., after a confident indication of a pedestrian object, as described above, has been associated with the state). In some examples, if an object is not detected and/or is detected but is not within a threshold distance of the pedestrian, the tracking component 432 can leave the score unchanged.

Block 710 illustrates determining whether the score is greater than or equal to a first threshold. In at least one example, the tracking component 432 can determine whether the score is greater than or equal to a first threshold. The first threshold can correspond to a score whereby the tracking component 432 can be confident that the object is a pedestrian object. As such, based at least in part on determining that the score is greater than or equal to the first threshold, the tracking component 432 can determine whether the state associated with the indication of the pedestrian is associated with a confident indication that the object is a pedestrian object, as illustrated at block 712. That is, if the state is already associated with a confident indication, then the pedestrian object has been present in previous portions of (e.g., lidar) data received over time such that the score associated with the state is already above the first threshold. However, if the state is not associated with a confident indication, then the score has not previously been above the first threshold. If the state is not associated with an indication that the object is a pedestrian object, the tracking component can associate the confident indication that the object is a pedestrian object with the state, as illustrated in block 714. In some examples, the tracking component 432 can refrain from associating the confident indication that the object is a pedestrian object until the tracking component 432 determines whether the object satisfies one or more additional criteria.

In some examples, an object can be detected by the model but may not be classified as a pedestrian object. In such an example, the tracking component 432 can analyze one or more additional criteria to determine that an object is a pedestrian object before associating the second indication (e.g., the confident indication) with the state. In at least one example, the tracking component 432 can consider (i) an area intersection ratio, (ii) whether the detected object overlaps a detected pedestrian, and (iii) whether the object is classified as a pedestrian. In at least one example, the area intersection ratio can represent an extent to which a best guess associated with a pedestrian object overlaps a current detection of an object. If the area intersection ratio is greater than or equal to a threshold, the tracking component 432 can associate the confident indication with the state (so long as the other two criteria are satisfied). In at least one example, if the detected object overlaps a detected pedestrian, the tracking component 432 can refrain from associating the confident indication with the state. That is, the tracking component 432 can associate the confident indication with the state so long as the detected object does not overlap a detected pedestrian (e.g., the indication of which the state is associated) (so long as the other two criteria are satisfied). Moreover, so long as the object is not classified as a pedestrian, the tracking component 432 can associate the confident indication with the state (so long as the other two criteria are satisfied). That is, in at least one example, if the detected object is classified as a pedestrian, the tracking component 432 can refrain from associating the confident indication with the state. In some examples, if the state is associated with the confident indication, indicating that an object is associated with a pedestrian (and is therefore a pedestrian object), such a classification can override the original classification output by the model.

In additional, or alternative examples, such a limitation need not be applied for associating the two. As non-limiting examples, similar techniques and modeling may be used to model and track two (or more) pedestrians travelling together (e.g., holding hands). In such examples, the limitation that the other object not be a pedestrian may be relaxed. Further in such examples, despite the fact that pedestrians may be detected and tracked on their own, if an indication is provided that the two (or more) are linked using the techniques described herein, more accurate state propagation of the multiple entities may be performed by taking into account better kinematic models.

In at least one example, if the score is not greater than or equal to a first threshold (at block 710), the process can return to block 702.

Block 716 illustrates determining whether the score is equal to a maximum score. In at least one example, the tracking component 432 can determine whether a score is equal to a maximum score. If the score is equal to a maximum score, the tracking component 432 can determine whether observation(s) are still being received, as illustrated in block 718. That is, the tracking component 432 can determine whether observation(s) (e.g., based at least in part on the lidar data) are still being received. If observation(s) are still being received, the process 700 can return to block 702 until observation(s) are no longer being received. If observation(s) are no longer being received, the process 700 can proceed to block 802 of FIG. 8.

If the score is not equal to a maximum score, the process can return to block 702.

In at least one example, the confident indication that an object is a pedestrian object that is associated with a pedestrian can override misclassifications (or non-classifications) originally output by the model. As described above with reference to FIG. 6, if a pedestrian is determined to be associated with a pedestrian object, the tracking component 432 can associate a first bounding region with the pedestrian, a second bounding region with the pedestrian object, and a third bounding region with the first bounding region and the second bounding region. That is, in at least one example, if a state indicates that a pedestrian is associated with a pedestrian object, the tracking component 432 can associate a bounding region (or other indication) with the portion of the lidar data that corresponds to the pedestrian object. In at least one example, based at least in part on detecting a pedestrian and a pedestrian object, the tracking component 432 can associate a bounding region with the pedestrian and the pedestrian object. That is, the tracking component 432 can output a bounding region that encompasses the bounding region and the bounding region. The bounding region can represent a compound object (e.g., the pedestrian/pedestrian object system).

In at least one example, based at least in part on the tracking component 432 associating the first, second, and third bounding regions with the lidar data, the tracking component 432 can send an indication of the indication of the pedestrian/pedestrian object system to one or more other vehicle component(s) 326, which can include a prediction component 424 and/or a planning component 426. In at least one example, the bounding region(s) can be associated with state information, which can include one or more poses of a pedestrian object. As described above, position information (associated with a pose) can include an output position (e.g., based on the model) and/or an estimated position (e.g., which can include the output position but occupy more space than the output position).

Figure 8:
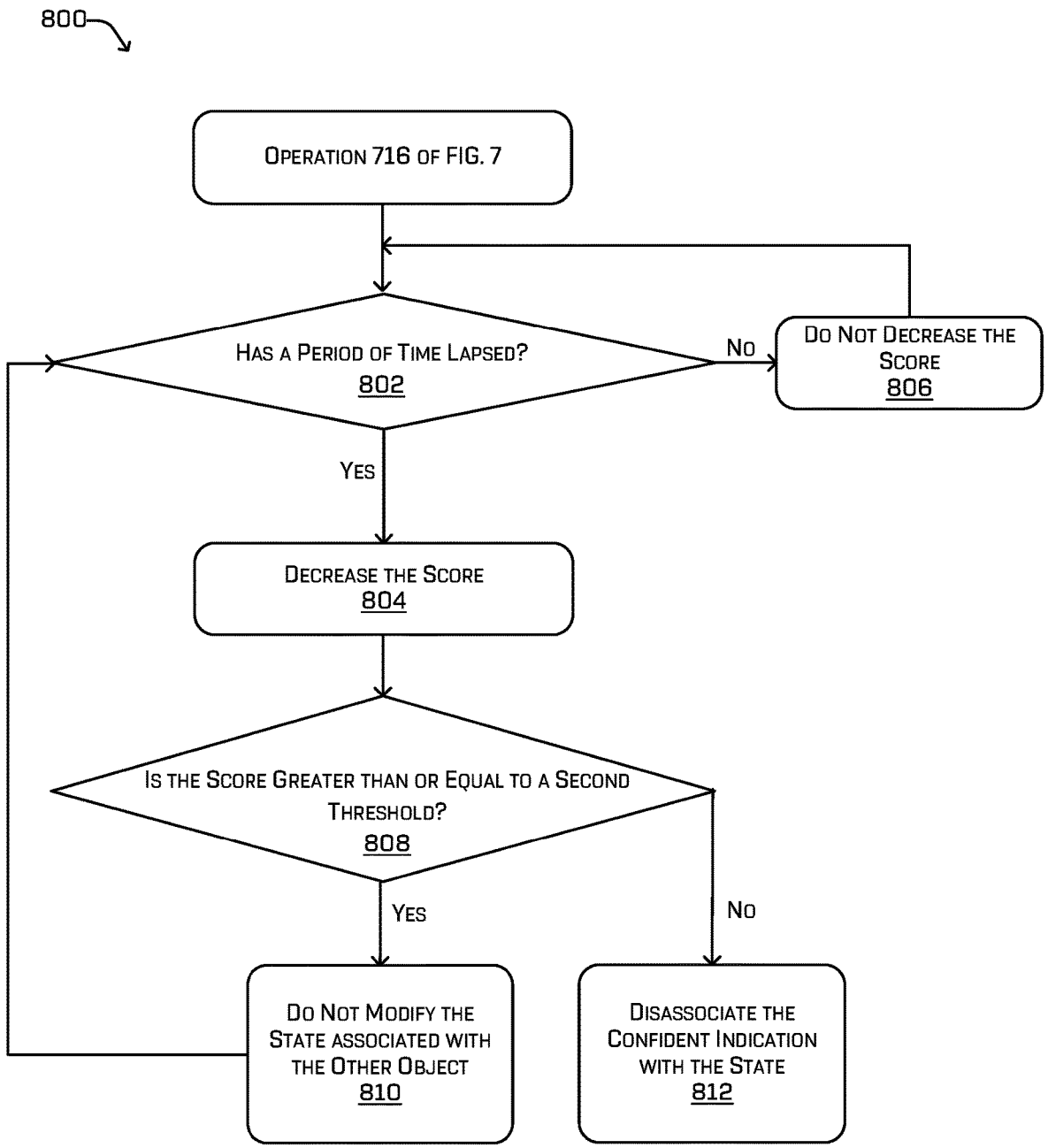
FIG. 8 illustrates an example process for determining whether a pedestrian object is associated with a pedestrian as described herein.

FIG. 8 illustrates an example process 800 for determining whether a pedestrian object is associated with a pedestrian as described herein.

Block 802 illustrates determining whether a period of time has lapsed. In at least one example, the tracking component 432 can determine whether a period of time has lapsed since the last observation was received. If the period of time has lapsed, the tracking component 432 can decrease the score, as illustrated in block 804. If the period of time has not lapsed, the tracking component 432 can refrain from decreasing the score, as illustrated in block 806, and the process 800 can return to block 802.

Block 808 illustrates determining whether the score is greater than or equal to a second threshold. In at least one example, the second threshold can be less than the first threshold. Based at least in part on determining that the score is greater than or equal to the second threshold, the process 800 can refrain from modifying the state associated with the indication of the pedestrian, as illustrated in block 810, and can return to block 802 to determine whether another period of time has lapsed. If the score is less than the second threshold, the tracking component 432 can disassociate the confident indication (of the pedestrian object) with the state, as illustrated in block 812. In at least one example, the period of time can be less than the rate at which new portions of sensor data received over time of sensor data (e.g., lidar data) are received such that the decay is slower than the rise in an effort to ensure that if a pedestrian object is present, that it is detected and the vehicle 402 can respond to it.

Example Clauses

A. A method comprising: receiving sensor data associated with an environment; receiving annotated data based at least in part on the sensor data, wherein the annotated data includes a first indication of a pedestrian with an object and a second indication of a pedestrian within the first indication of the pedestrian with the object; determining, based at least in part on the annotated data, a third indication of a pedestrian object associated with the second indication of the pedestrian, wherein the second indication of the pedestrian and the third indication of the pedestrian object comprise a training input; inputting the training input into a model; determining, by the model, an output comprising a fourth indication of the pedestrian object; determining a difference between the output and the annotated data; modifying, based at least in part on the difference, one or more parameters of the model; and; and transmitting the model to a vehicle configured to be controlled by another output of the model.

B. The method as paragraph A recites, wherein determining the third indication of the pedestrian object comprises subtracting at least a portion of the annotated data associated with the second indication of the pedestrian from a portion of the annotated data associated with the first indication of the pedestrian with the object.

C. The method as paragraph B recites, wherein subtracting at least the portion of the annotated data associated with the second indication of the pedestrian from the portion of the annotated data associated with the first indication of the pedestrian with the object is based at least in part on applying a geometric algorithm to the annotated data.

D. The method as any of claims A-C recites, further comprising applying a loss weight mask to the training input, wherein a portion of the annotated data associated with the third indication of the pedestrian object is weighted more than a portion of the annotated data associated with the second indication of the pedestrian.

E. The method as any of claims A-D recites, wherein the sensor data comprises lidar data and the model is trained via machine learning to segment the lidar data and determine classifications associated with individual segments of the lidar data, at least one classification corresponding to the pedestrian object.

F. A system comprising: one or more processors; and one or more non-transitory computer-readable media storing instructions, that when executed by the one or more processors, cause the system to perform operations comprising: receiving sensor data associated with an environment; determining annotated data based at least in part on the sensor data, wherein the annotated data includes a first indication of a first object and a second indication of a second object, wherein the first object and the second object comprise a compound object; inputting training input into a model, wherein the training input comprises the annotated data; determining, by the model, an output comprising a third indication of the second object; determining a difference between the output and the annotated data; and modifying, based at least in part on the difference, one or more parameters of the model.

G. The system as paragraph F recites, wherein the annotated data further includes a fourth indication of the compound object, the operations further comprising determining the second indication of the second object based at least in part on subtracting a portion of annotated data associated with the first indication of the first object from a portion of the annotated data associated with the fourth indication of the compound object.

H. The system as paragraph G recites, wherein subtracting at least the portion of the annotated data associated with the first indication of the first object from the portion of the annotated data associated with the fourth indication of the compound object is based at least in part on applying a geometric algorithm to the annotated data.

I. The system as any of claims F-H recites, further comprising applying a loss weight mask to the training input, wherein a portion of the annotated data associated with the second indication of the second object is weighted more than a portion of the annotated data associated with the first indication of the first object.

J. The system as any of claims F-I recites, the operations further comprising transmitting the model to at least one vehicle configured to be controlled by another output of the model.

K. The system as any of claims F-J recites, wherein the compound object comprises a pedestrian with an object, the first object comprises a pedestrian, and the second object comprises a pedestrian object.

L. The system as paragraph K recites, wherein the pedestrian object comprises a stroller, a suitcase, an umbrella, a large box, a child, a motorcycle, a cart, or a wheelchair.

M. One or more non-transitory computer-readable media storing instructions, that when executed by one or more processors, cause the one or more processors to perform operations comprising: determining, from sensor data associated with an environment, annotated data associated with a first indication of a first object and a second indication of a second object, wherein the first object and the second object comprise a compound object; training a model to determine an output associated with a second object based at least in part on the annotated data; and transmitting the model to at least one vehicle configured to be controlled by another output of the model.

N. The one or more non-transitory computer-readable media as paragraph M recites, wherein training the model comprises: inputting the annotated data into the model; determining, by the model, the output comprising a third indication of the second object; determining a difference between the output and the annotated data; and modifying, based at least in part on the difference, one or more parameters of the model.

O. The one or more non-transitory computer-readable media as paragraph M or N recites, the operations further comprising determining the second indication of a second object based at least in part on the first indication of the first object and a third indication of the compound object.

P. The one or more non-transitory computer-readable media as paragraph O recites, wherein determining the second indication of the second object comprises subtracting at least a portion of the annotated data associated with the first indication of the first object from a portion of the annotated data associated with the third indication of the compound object.

Q. The one or more non-transitory computer-readable media as any of claims M-P recites, further comprising applying a loss weight mask to the annotated data, wherein a portion of the annotated data associated with the second indication of the second object is weighted more than a portion of the annotated data associated with the first indication of the first object.

R. The one or more non-transitory computer-readable media as any of claims M-Q recites, wherein the compound object comprises a pedestrian with an object, the first object comprises a pedestrian, and the second object comprises a pedestrian object.

S. The one or more non-transitory computer-readable media as paragraph R recites, wherein the compound object is associated with a third indication that comprises a first bounding region, the first indication of the first object comprises a second bounding region within the first bounding region, and the second indication of the second object comprises a third bounding region within the first bounding region.

T. The one or more non-transitory computer-readable media as any of claims M-S recites, wherein the sensor data comprises lidar data and the model is trained via machine learning to segment the lidar data and determine classifications associated with individual segments of the lidar data, at least one classification corresponding to the second object.

U. A method comprising: receiving lidar data from one or more sensors associated with a vehicle; detecting, by a model and based at least in part on the lidar data, a pedestrian proximate to the vehicle, the pedestrian detection comprising a first bounding region; determining that the pedestrian is associated with a pedestrian object, the pedestrian object comprising a second bounding region; associating the first bounding region and the second bounding region with a third bounding region, wherein the third bounding region encompasses the first bounding region and the second bounding region; and providing the first bounding region, the second bounding region, and the third bounding region to at least one of a prediction component or a planning component of the vehicle for controlling the vehicle.

V. The method as paragraph U recites, wherein determining that the pedestrian is associated with the pedestrian object comprises receiving, from a model, an output indicating a detection of the pedestrian object.

W. The method as paragraph V recites, wherein determining that the pedestrian is associated with the pedestrian object is based at least in part on a score determined based on analyzing the lidar data over time.

X. The method as paragraph W recites, wherein the score is determined based at least in part on: analyzing one or more portions of the lidar data received over time; and increasing the score each time a pedestrian object is detected.

Y. The method as paragraph W or X recites, further comprising: determining that the score is greater than or equal to a threshold; and determining that the pedestrian is associated with the pedestrian object based at least in part on determining that the score is greater than or equal to the threshold.

Z. A system comprising: one or more processors; and one or more non-transitory computer-readable media storing instructions, that when executed by the one or more processors, cause the system to perform operations comprising: receiving data from one or more sensors associated with a vehicle; determining an observation associated with the data, wherein the observation is associated with a first object; determining whether the first object is associated with a second object, wherein the first object and the second object comprise a compound object; and providing an indication of the first object or an indication of the compound object to at least one of a prediction component or a planning component of the vehicle for controlling the vehicle.

AA. The system as paragraph Z recites, the operations further comprising associating a kinematic model with the second object based at least in part on the association of the first object with the second object.

AB. The system as paragraph AA recites, the operations further comprising: determining a semantic classification of the second object; and determining the kinematic model associated with the second object based at least in part on the semantic classification.

AC. The system as paragraph AA or AB recites, wherein associating the first object and the second object in new data received over time based at least in part on the kinematic model.

AD. The system as any of claims Z-AC recites, the operations further comprising determining to associate the first object and the second object based at least in part on a score indicating whether a detected object is associated with a classification corresponding to the second object.

AE. The system as paragraph AD recites, the operations further comprising: analyzing one or more portions of the data over time; and increasing the score each time a detected object is within a threshold distance of the first object.

AF. The system as paragraph AD or AE recites, the operations further comprising: determining that the score is greater than or equal to a first threshold; and determining the first object is associated with the second object based at least in part on determining that the score is greater than or equal to the first threshold.

AG. The system as paragraph AF recites, wherein determining that the first object is associated with the second object is further based at least in part on one or more of (i) an area intersection ratio, (ii) an indication of whether the detected object overlaps the first object, or (iii) an indication whether the detected object is classified as a same class as the first object.

AH. The system as any of claims Z-AG recites, the operations further comprising: determining at least one position associated with the second object, wherein the at least one position comprises an output position of the second object, wherein the output position is output by a model trained to detect at least the first object and the second object; or an estimated position of the second object, wherein the estimated position includes the output position; and associating the at least one position with the indication of the compound object.

AI. The system as any of claims Z-AH recites, wherein the compound object comprises a pedestrian with an object, the first object comprises a pedestrian, and the second object comprises a pedestrian object, and wherein the pedestrian object comprises a stroller, a suitcase, an umbrella, a large box, a child, a motorcycle, a cart, or a wheelchair.

AJ. One or more non-transitory computer-readable media storing instructions, that when executed by one or more processors, cause the one or more processors to perform operations comprising: receiving data from one or more sensors associated with a vehicle; determining an observation associated with the data, wherein the observation is associated with a first object; determining whether the first object is associated with a second object, wherein the first object and the second object comprise a compound object; and providing an indication of the first object or an indication of the compound object to at least one of a prediction component or a planning component of the vehicle for controlling the vehicle.

AK. The one or more non-transitory computer-readable media as paragraph AJ recites, the operations further comprising: analyzing one or more portions of the data over time; and increasing a score each time a detected object is within a threshold distance of the first object, wherein the score indicates a likelihood that the first object is associated with the second object.

AL. The one or more non-transitory computer-readable media as paragraph AK recites, the operations further comprising: determining that the score is greater than or equal to a threshold; and determining that the first object is associated with the second object.

AM. The one or more non-transitory computer-readable media as any of claims AJ-AL recites, the operations further comprising associating a kinematic model with the second object based at least in part on the association of the first object with the second object, wherein associating the first object and the second object in new sensor data received over time is based at least in part on the kinematic model.

AN. The one or more non-transitory computer-readable media as any of claims AJ-AM recites, the operations further comprising: determining at least one of an output position of the second object or an estimated position of the second object, wherein the estimated position is determined based at least in part on the output position and one or more previous positions associated with the second object; and if a noise metric associated with a model trained to detect at least the first object and the second object is greater than or equal to a threshold, providing the estimated position to the at least one of the prediction component or the planning component with the indication of the compound object, and if the noise metric associated with the model is below the threshold, providing the output position to the at least one of the prediction component or the planning component with the indication of the compound object. While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
  receiving, by one or more processors, sensor data associated with an environment;
  determining, based at least in part on the sensor data, a training input, wherein determining the training input comprises:
    receiving annotated data based at least in part on the sensor data, wherein the annotated data includes (i) a first bounding region associated with a pedestrian and an object proximate the pedestrian and (ii) a second bounding region associated with the pedestrian within the first bounding region;
    determining, based at least in part on the annotated data, a third bounding region associated with the object within the first bounding region, wherein the second bounding region associated with the pedestrian and the third bounding region associated with the object comprise the training input;
  training, based at least in part on the training input, a model, wherein training the model comprises:
    inputting the training input into the model;
    applying a loss weight mask to the training input;
    determining, by the model and based at least in part on the training input, an output comprising a fourth bounding region associated with the object;
    determining a difference between the fourth bounding region and the third bounding region;

modifying, based at least in part on the difference, one or more parameters of the model; and transmitting the model to a vehicle configured to be controlled by another output of the model.

2. The method as claim 1 recites, wherein determining the third bounding region associated with the object comprises subtracting at least a portion of the annotated data associated with the second bounding region associated with the pedestrian from a portion of the annotated data associated with the first bounding region associated with the pedestrian and the object proximate the pedestrian.

3. The method as claim 2 recites, wherein subtracting at least the portion of the annotated data associated with the second bounding region associated with the pedestrian from the portion of the annotated data associated with the first bounding region associated with the pedestrian and the object proximate the pedestrian is based at least in part on applying a geometric algorithm to the annotated data.

4. The method as claim 1 recites, wherein applying the loss weight mask to the training input comprises weighing a portion of the annotated data associated with the third bounding region associated with the object more than a portion of the annotated data associated with the second bounding region associated with the pedestrian.

5. The method as claim 1 recites, wherein the sensor data comprises lidar data and the model is trained via machine learning to segment the lidar data and determine classifications associated with individual segments of the lidar data, at least one classification corresponding to the object.

6. The method as claim 1 recites, wherein the second bounding region and the third bounding region are subsets of the first bounding region.

7. A system comprising:
one or more processors; and
one or more non-transitory computer-readable media storing instructions, that when executed by the one or more processors, cause the system to perform operations comprising:
receiving sensor data associated with an environment;
determining annotated data based at least in part on the sensor data, wherein the annotated data includes a first bounding region associated with a first object and a second bounding region associated with a second object, wherein the first object and the second object comprise a compound object;
training, based at least in part on the annotated data, a model, wherein training the model comprises:
inputting the annotated data into the model;
determining, by the model and based at least in part on the annotated data, an output comprising a third bounding region associated with the second object;
determining a difference between the output and the annotated data; and
modifying, based at least in part on the difference, one or more parameters of the model.

8. The system as claim 7 recites, wherein the annotated data further includes a fourth bounding region associated with the compound object, the operations further comprising determining the second bounding region associated with the second object based at least in part on subtracting a portion of the annotated data associated with the first bounding region associated with the first object from a portion of the annotated data associated with the fourth bounding region associated with the compound object.

9. The system as claim 8 recites, wherein subtracting at least the portion of the annotated data associated with the first bounding region associated with the first object from the portion of the annotated data associated with the fourth bounding region associated with the compound object is based at least in part on applying a geometric algorithm to the annotated data.

10. The system as claim 7 recites, wherein training the model further comprises applying a loss weight mask to the annotated data, wherein a portion of the annotated data associated with the second bounding region associated with the second object is weighted more than a portion of the annotated data associated with the first bounding region associated with the first object.

11. The system as claim 7 recites, the operations further comprising transmitting the model to at least one vehicle configured to be controlled by another output of the model.

12. The system as claim 7 recites, wherein the compound object comprises a pedestrian and an object proximate the pedestrian, the first object comprises the pedestrian, and the second object comprises the object.

13. The system as claim 12 recites, wherein the object comprises a stroller, a suitcase, an umbrella, a large box, a child, a motorcycle, a cart, or a wheelchair.

14. One or more non-transitory computer-readable media storing instructions, that when executed by one or more processors, cause the one or more processors to perform operations comprising:
determining, from sensor data associated with an environment, annotated data comprising a first bounding region associated with a first object and second bounding region associated with a second object, wherein the first object and the second object comprise a compound object;
training, based at least in part on the annotated data, a model, wherein training the model comprises:
inputting the annotated data into the model;
determining, by the model, an output comprising a third bounding region associated with the second object;
determining a difference between the output and the annotated data; and
modifying, based at least in part on the difference, one or more parameters of the model; and
transmitting the model to at least one vehicle configured to be controlled by another output of the model.

15. The one or more non-transitory computer-readable media as claim 14 recites, wherein determining the annotated data further comprises determining the second bounding region associated with the second object based at least in part on the first bounding region associated with the first object and the third bounding region associated with the compound object.

16. The one or more non-transitory computer-readable media as claim 15 recites, wherein determining the second bounding region associated with the second object comprises subtracting at least a portion of the annotated data associated with the first bounding region associated with the first object from a portion of the annotated data associated with the third bounding region associated with the compound object.

17. The one or more non-transitory computer-readable media as claim 14 recites, wherein training the model further comprises applying a loss weight mask to the annotated data, wherein a portion of the annotated data associated with the second bounding region associated with the second object is weighted more than a portion of the annotated data associated with the first bounding region associated with the first object.

18. The one or more non-transitory computer-readable media as claim 14 recites, wherein the compound object comprises a pedestrian and an object proximate the pedestrian, the first object comprises the pedestrian, and the second object comprises the object.

19. The one or more non-transitory computer-readable media as claim 18 recites, wherein the compound object is associated with the third bounding region; and
   wherein the first bounding region associated with the first object and the second bounding region associated with the second object are positioned within the third bounding region.

20. The one or more non-transitory computer-readable media as claim 14 recites, wherein the sensor data comprises lidar data and the model is trained via machine learning to segment the lidar data and determine classifications associated with individual segments of the lidar data, at least one classification corresponding to the second object.

* * * * *